US012698862B2

(12) United States Patent
Lin et al.

(10) Patent No.: US 12,698,862 B2
(45) Date of Patent: Aug. 4, 2026

(54) QUICK-RELEASE ASSEMBLY, CONNECTION STRUCTURE, PHOTOGRAPHY ACCESSORY, AND QUICK-RELEASE KIT

(71) Applicant: SHENZHEN LEQI INNOVATION CO., LTD., Shenzhen (CN)

(72) Inventors: Qiang Lin, Shenzhen (CN); Feng Zhou, Shenzhen (CN); Zhiqiang Pan, Shenzhen (CN); Keman Yan, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 75 days.

(21) Appl. No.: 18/628,826

(22) Filed: Apr. 8, 2024

(65) Prior Publication Data

US 2024/0426417 A1     Dec. 26, 2024

(30) Foreign Application Priority Data

| | | |
|---|---|---|
| Jun. 26, 2023 | (CN) | 202321635960.6 |
| Jun. 26, 2023 | (CN) | 202321644282.X |
| Jun. 26, 2023 | (CN) | 202321649788.X |
| Nov. 20, 2023 | (CN) | 202311553705.1 |
| Dec. 22, 2023 | (CN) | 202323536209.3 |

(51) Int. Cl.
*F16M 11/04* (2006.01)

(52) U.S. Cl.
CPC ......... *F16M 11/041* (2013.01); *F16M 11/045* (2013.01); *F16M 2200/028* (2013.01)

(58) Field of Classification Search
CPC ............... F16M 11/041; F16M 11/045; F16M 2200/028
See application file for complete search history.

(56) References Cited

U.S. PATENT DOCUMENTS

| | | | | |
|---|---|---|---|---|
| 4,466,595 A | * | 8/1984 | O'Connor | F16M 13/022 |
| | | | | 248/187.1 |
| 4,929,973 A | * | 5/1990 | Nakatani | F16M 11/041 |
| | | | | 396/419 |
| 7,185,862 B1 | * | 3/2007 | Yang | F16M 11/041 |
| | | | | 396/428 |

(Continued)

FOREIGN PATENT DOCUMENTS

| | | | | |
|---|---|---|---|---|
| CN | 114233999 A | * | 3/2022 | G03B 17/561 |

*Primary Examiner* — Monica E Millner

(57) ABSTRACT

The present disclosure provides a quick-release assembly, a connection structure, a photography accessory, and a quick-release kit. The quick-release assembly includes: a mounting base, a top end thereof being defined with a fixing slot, a bottom end thereof being defined with an accommodation slot, a limiting groove being defined in a bottom wall, an opening at one end of the limiting groove being communicated with the accommodation slot, and an opening at the other end of the limiting groove being communicated with the fixing slot; a sliding member slidably accommodated in the accommodation slot; and a resisting member received in the limiting groove. After assembly, one end of the resisting member abuts against the sliding member, and the other end of the resisting member extends out of a bottom wall surface of the fixing slot.

13 Claims, 16 Drawing Sheets

(56)  References Cited

U.S. PATENT DOCUMENTS

| 7,431,247 | B2 * | 10/2008 | Bobro | F41A 23/10 |
| | | | | 248/176.1 |
| 8,398,315 | B2 * | 3/2013 | Johnson | G03B 17/566 |
| | | | | 396/422 |
| 8,418,973 | B2 * | 4/2013 | Liu | F16M 11/2035 |
| | | | | 248/176.1 |
| 8,827,219 | B2 * | 9/2014 | Kessler | F16M 11/041 |
| | | | | 396/428 |
| 10,371,317 | B2 * | 8/2019 | Chen | F16M 13/022 |
| 10,966,331 | B2 * | 3/2021 | Roth | H04B 1/3888 |
| 11,852,179 | B2 * | 12/2023 | Halverson | F41A 23/18 |
| 2015/0323855 | A1 * | 11/2015 | Overall | G03B 17/566 |
| | | | | 396/419 |
| 2016/0047402 | A1 * | 2/2016 | Martinez Gonzalez | |
| | | | | F16B 2/065 |
| | | | | 403/374.3 |
| 2020/0050086 | A1 * | 2/2020 | Thomson | F16M 13/02 |
| 2022/0042647 | A1 * | 2/2022 | Wu | G03B 17/563 |
| 2022/0404688 | A1 * | 12/2022 | Zhou | H04N 23/51 |

* cited by examiner

QUICK-RELEASE ASSEMBLY, CONNECTION STRUCTURE, PHOTOGRAPHY ACCESSORY, AND QUICK-RELEASE KIT

TECHNICAL FIELD

The present disclosure relates to the technical field of photography equipment, and in particular, to a quick-release assembly, a connection structure, a photography accessory, and a quick-release kit.

BACKGROUND

With the improvement of living standards, photography has become an important part of people's lives, and the demand for photographic experience is becoming higher and higher. Different photography assemblies are needed to assemble a variety of electronic devices to assist in photography. The photography assemblies include a slider, a cage, a camera protective housing, a monitor protective housing, a side handle, a top handle, a shoulder-mount system, and the like. The electronic devices include a camera, a monitor, a flash lamp, a microphone, a wireless image transmission system, and the like. For example, a side handle is fixed on a camera protective housing by a quick-release assembly interface. Chinese Patent No. CN202122923541X provides a photography equipment connection module and a photography assembly, which, however, is inconvenient, laborious, and time-consuming to operate.

SUMMARY

A main objective of the present disclosure is to provide a quick-release assembly, a connection structure, a photography accessory, and a quick-release kit, to solve the problem in related art that the quick-release assembly is inconvenient, laborious, and time-consuming to operate.

According to an aspect, the present disclosure provides a quick-release assembly, including:

a mounting base, a top end of the mounting base being defined with a fixing slot running left and right, a bottom end of the mounting base being defined with an accommodation slot, a limiting groove being defined in a bottom wall of the fixing slot, an opening at one end of the limiting groove being communicated with the accommodation slot, and an opening at the other end of the limiting groove being communicated with the fixing slot;

a sliding member slidably accommodated in the accommodation slot; and a resisting member received in the limiting groove;

where after assembly, one end of the resisting member abuts against the sliding member, and the other end of the resisting member extends out of a bottom wall surface of the fixing slot; and the sliding member is operated to slide to a first position to allow the sliding member to release the resisting member; and the sliding member is released to allow the sliding member to drive the resisting member to reset.

According to another aspect, the present disclosure provides a quick-release assembly, including:

a mounting base, the mounting base being defined with a fixing slot and being sleeved on a structural member through the fixing slot, the structural member being defined with an engaging groove; an actuation structure, an elastic member, and a resisting member being disposed on the mounting base, the resisting member being exposed on a side wall of the fixing slot and fitting the engaging groove, the actuation structure being movably disposed on the mounting base, and the elastic member being configured to apply a force on the actuation structure to reset the actuation structure;

where the quick-release assembly has an unlocked state and a locked state; in the unlocked state, the actuation structure releases the resisting member to allow the resisting member to be disengaged from the engaging groove; and in the locked state, the actuation structure resets and presses the resisting member to allow the resisting member to be engaged in the engaging groove.

According to still another aspect, the present disclosure provides a connection structure, including:

an upper connection base, configured to be connected with a first device; and a lower connection base, configured to be connected with a second device, the lower connection base being defined with an engaging groove, the lower connection base being detachably connected to the upper connection base by a quick-release component, the quick-release component comprising an actuation structure, an elastic member, and a resisting member, the resisting member being exposed on an outer surface of the upper connection base and fitting the engaging groove, the actuation structure being movably disposed on the upper connection base, and the elastic member applying a force on the actuation structure to reset the actuation structure;

where the connection structure has an unlocked state and a locked state; in the unlocked state, the actuation structure releases the resisting member to allow the resisting member to be disengaged from the engaging groove; and in the locked state, the actuation structure resets and presses the resisting member to allow the resisting member to be engaged in the engaging groove.

According to still another aspect, the present disclosure provides a photography accessory, including:

an accessory body; and a quick-release assembly, including:

a mounting base connected with the accessory body, a top end of the mounting base being defined with a fixing slot running left and right, a bottom end of the mounting base being defined with an accommodation slot, a limiting groove being defined in a bottom wall of the fixing slot, an opening at one end of the limiting groove being communicated with the accommodation slot, and an opening at the other end of the limiting groove being communicated with the fixing slot;

a sliding member slidably accommodated in the accommodation slot; and a resisting member received in the limiting groove;

where after assembly, one end of the resisting member abuts against the sliding member, and the other end of the resisting member extends out of a bottom wall surface of the fixing slot; and the sliding member is operated to slide to a first position to allow the sliding member to release the resisting member; and the sliding member is released to allow the sliding member to drive the resisting member to reset.

According to still another aspect, the present disclosure provides a quick-release kit, including:

a structural member; and a photography accessory, including:

an accessory body; and a quick-release assembly detachably connected with the quick-release assembly, the quick-release assembly including:

a mounting base connected with the accessory body, a top end of the mounting base being defined with a fixing slot running left and right, a bottom end of the mounting base being defined with an accommodation slot, a limiting groove being defined in a bottom wall of the fixing slot, an opening at one end of the limiting groove being communicated with the accommodation slot, and an opening at the other end of the limiting groove being communicated with the fixing slot;

a sliding member slidably accommodated in the accommodation slot; and a resisting member received in the limiting groove;

where after assembly, one end of the resisting member abuts against the sliding member, and the other end of the resisting member extends out of a bottom wall surface of the fixing slot; and the sliding member is operated to slide to a first position to allow the sliding member to release the resisting member; and the sliding member is released to allow the sliding member to drive the resisting member to reset;

where the structural member includes a first frame, the first frame is defined with a plurality of engaging grooves arranged in parallel and at intervals; and after assembly, one end of the resisting member extends out of a bottom wall surface of the fixing slot, to abut against an inner surface of one of the plurality of engaging grooves.

The quick-release assembly provided by the present disclosure is configure to be detachably connected with a structural member. The structural member includes a first frame. The first frame may be in a clearance fit with the inner wall of the fixing slot. Each side wall of two opposite side walls of the fixing slot is located on one side of two sides of the first frame. Each of the two opposite side walls of the fixing slot is protruded with a retaining part. The two retaining parts extend toward the inside of the fixing slot to prevent the two sides of the first frame from being separated from the upper side of the fixing slot.

When assembling, the sliding member is operated to slide to the first position so as to release all the resisting members. After the pressing force applied by the sliding member disappears, all the resisting members can retreat into the limiting grooves. Therefore, in the process of the first frame sliding into the fixing slot from the opening on one side of the fixing slot, the surface of the first frame pushes the resisting members into the limiting grooves, and the surface of the first frame slides along the peripheral surfaces of the resisting members. After the first frame slides to the position expected by a user (which may be called a preset position), the sliding member is released, and may drive the resisting members to reset. Each resisting member slides along the inner wall of one avoidance groove to the top surface adjacent to the opening of the avoidance groove, and is gradually inserted in one limiting groove. In this way, the first frame is fixed in the horizontal direction, which achieves locking of the first frame on the mounting base. The resisting members abut between the first frame and the mounting base, so that the mounting base provides a bearing force on the structural member in the vertical direction, which prevents shaking between the first frame and the mounting base. The quick-release assembly provided by the present disclosure is easy to operate and has the advantage of simple structure, thereby improving the user experience.

When disassembling, the sliding member is operated to slide to the first position so as to release all the resisting members. After the pressing force applied by the sliding member disappears, the resisting members release the first frame. In the process of the first frame sliding out of the fixing slot, the surface of the first frame slides along all the resisting members, and also the resisting members are disengaged from the engaging grooves of the first frame and retreat into the limiting grooves. After the first frame slides out of the fixing slot, the sliding member is released and drives the resisting members to reset. The quick-release assembly provided by the present disclosure is convenient, labor-saving, and time-reducing to operate.

US 12,698,862 B2

5

Figure 19:
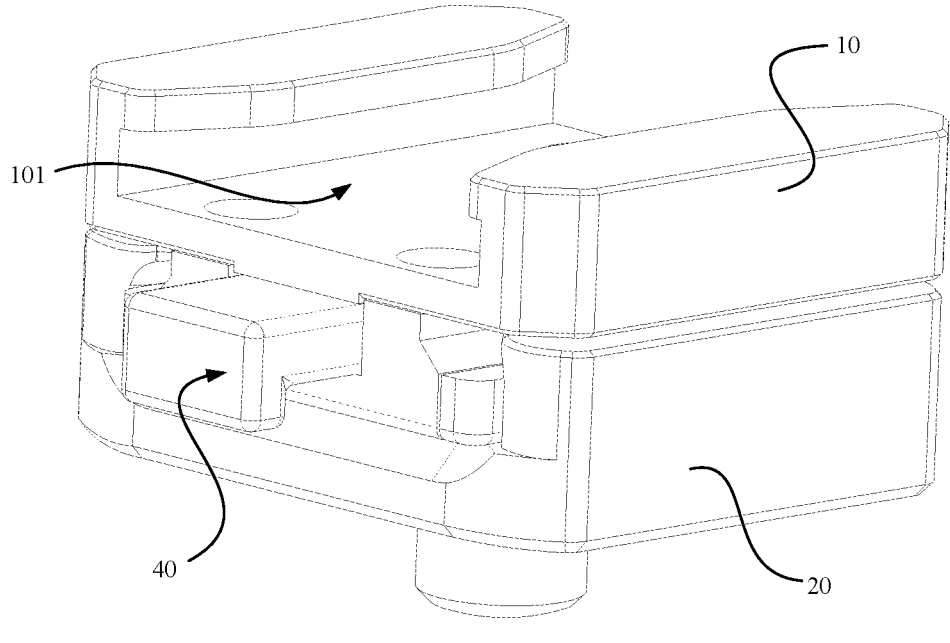

FIG. 19 is a structural schematic diagram of a connection structure according to an embodiment of the present disclosure.

Figure 20:
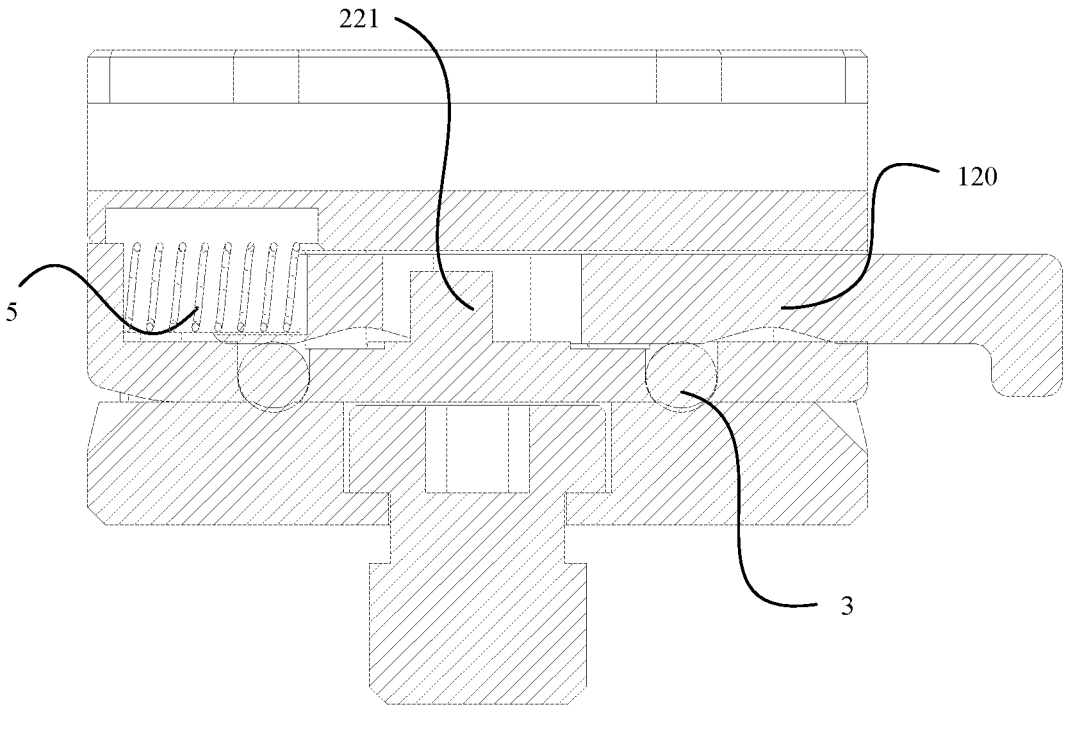

FIG. 20 is a sectional diagram of a connection structure according to an embodiment of the present disclosure.

Figure 21:
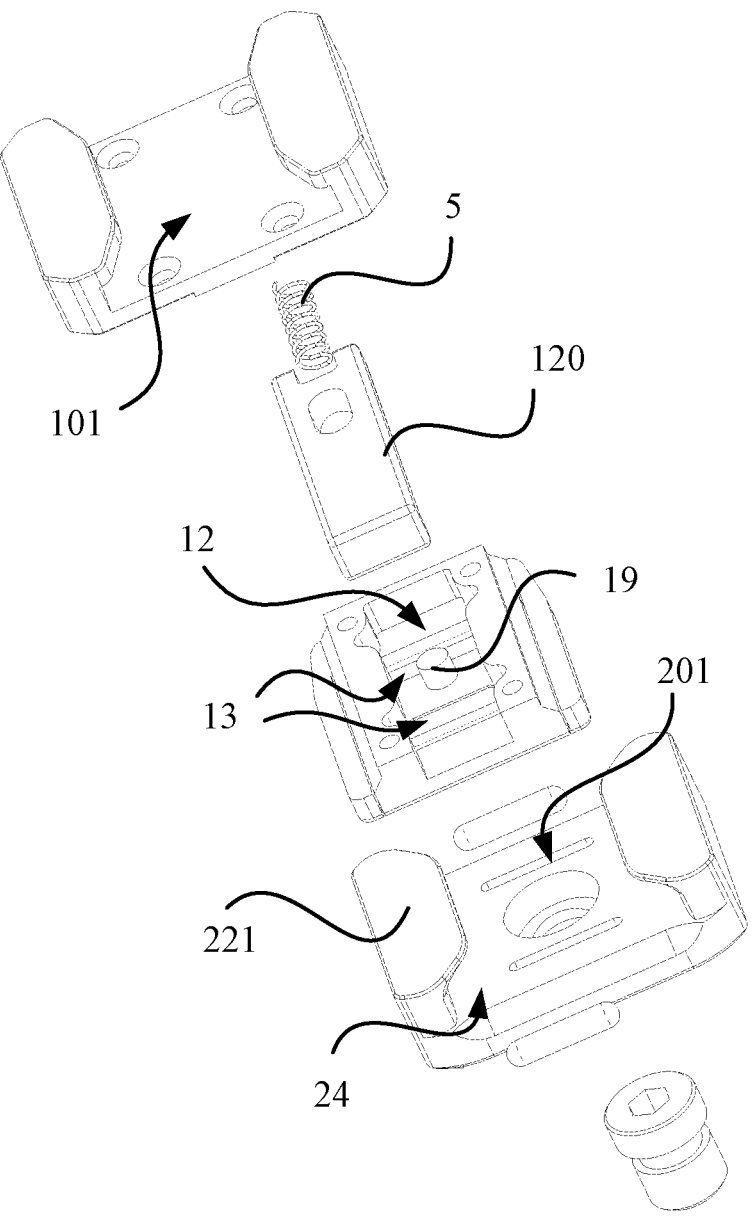

FIG. 21 is an exploded diagram of a connection structure according to an embodiment of the present disclosure from a perspective.

Figure 22:
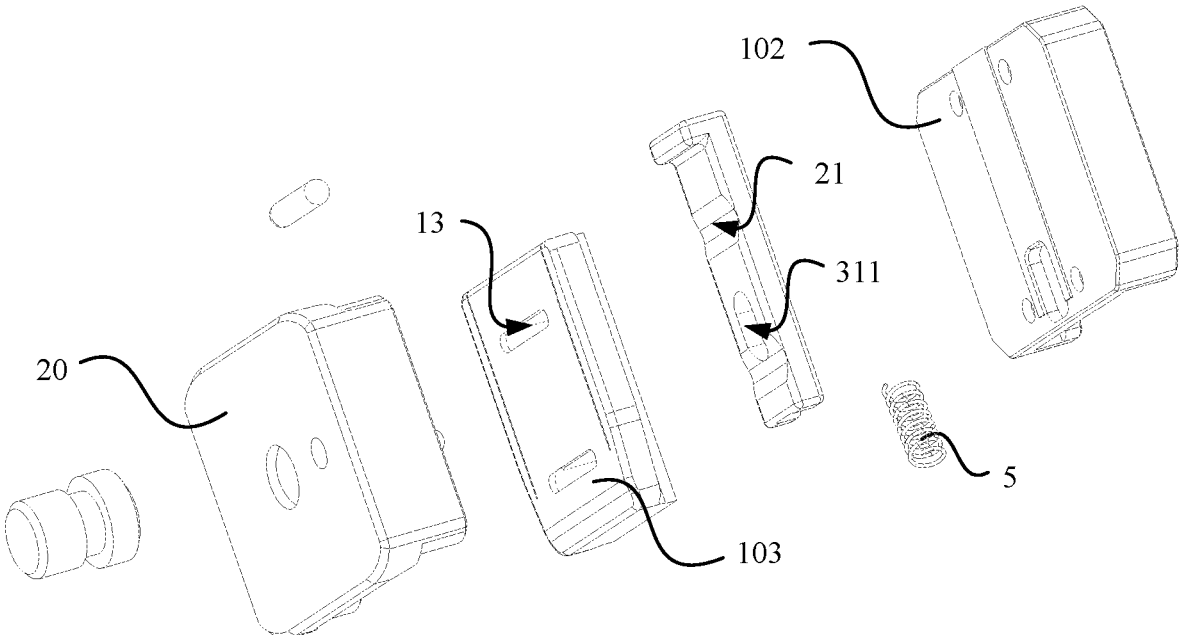

FIG. 22 is an exploded diagram of a connection structure according to an embodiment of the present disclosure from another perspective.

The implementations, features and advantages of the present disclosure will be further explained in combination with embodiments and with reference to the attached drawings.

DESCRIPTION OF EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely used to explain relative position relationships or motion conditions between the components in a specific attitude (as shown in the drawings). The directional indication changes as the specific attitude changes.

It should be noted that when an element is described as "being fixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the number of the technical features indicated. Thus, the feature defined by "first" or "second" may explicitly or implicitly include at least one such feature. In addition, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

Figure 1:
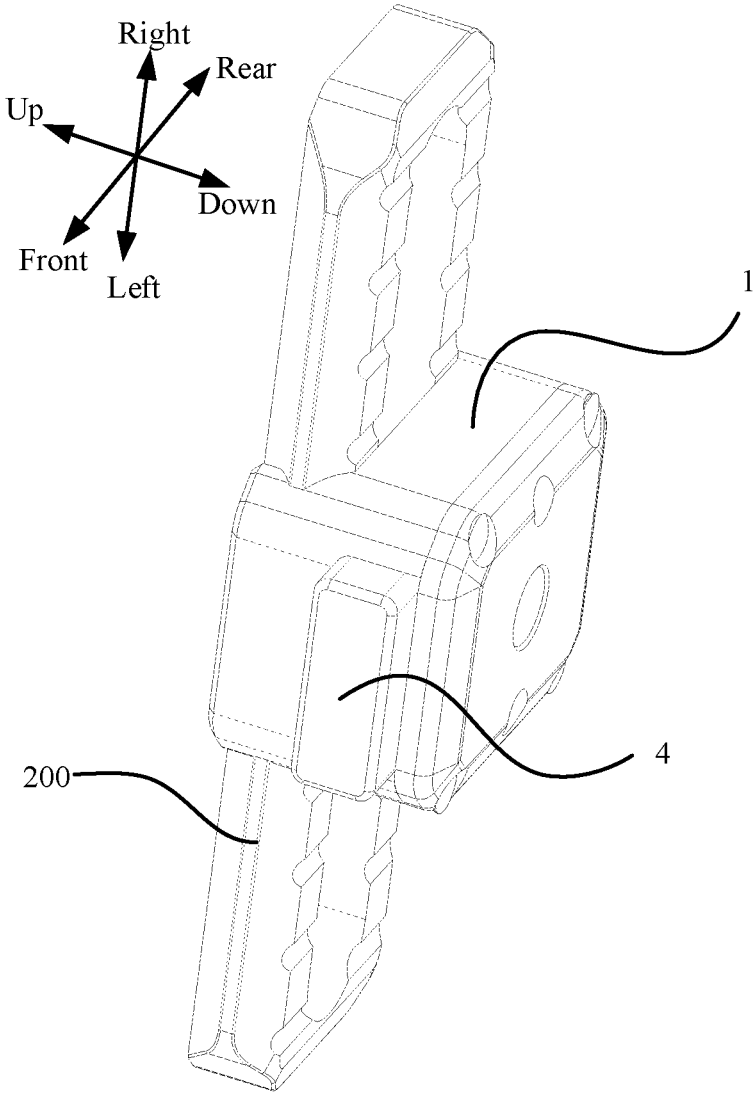
FIG. 1 is a structural schematic diagram of a quick-release assembly in use according to an embodiment of the present disclosure.
Figure 2:
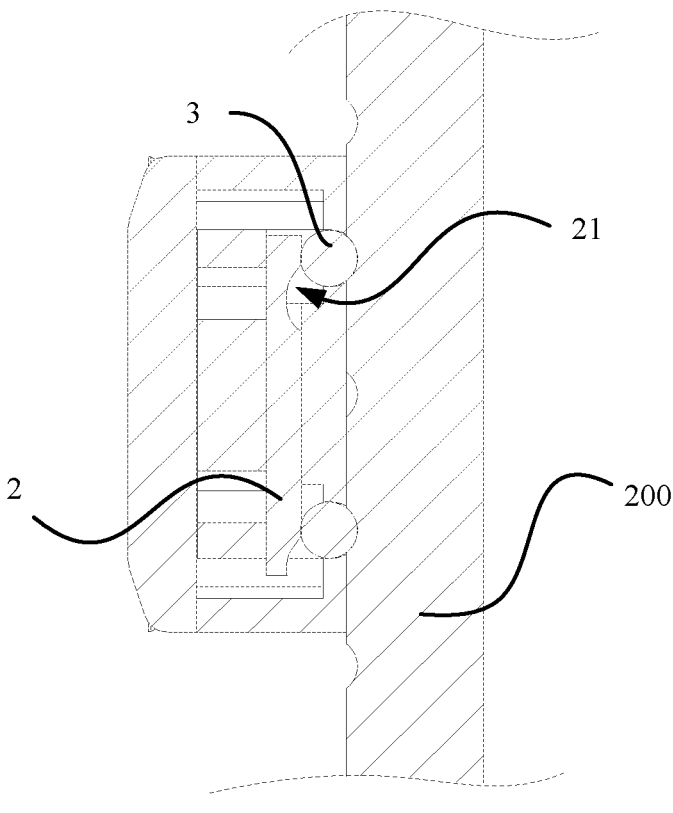
FIG. 2 is a sectional diagram of the quick-release assembly in FIG. 1.
Figure 3:
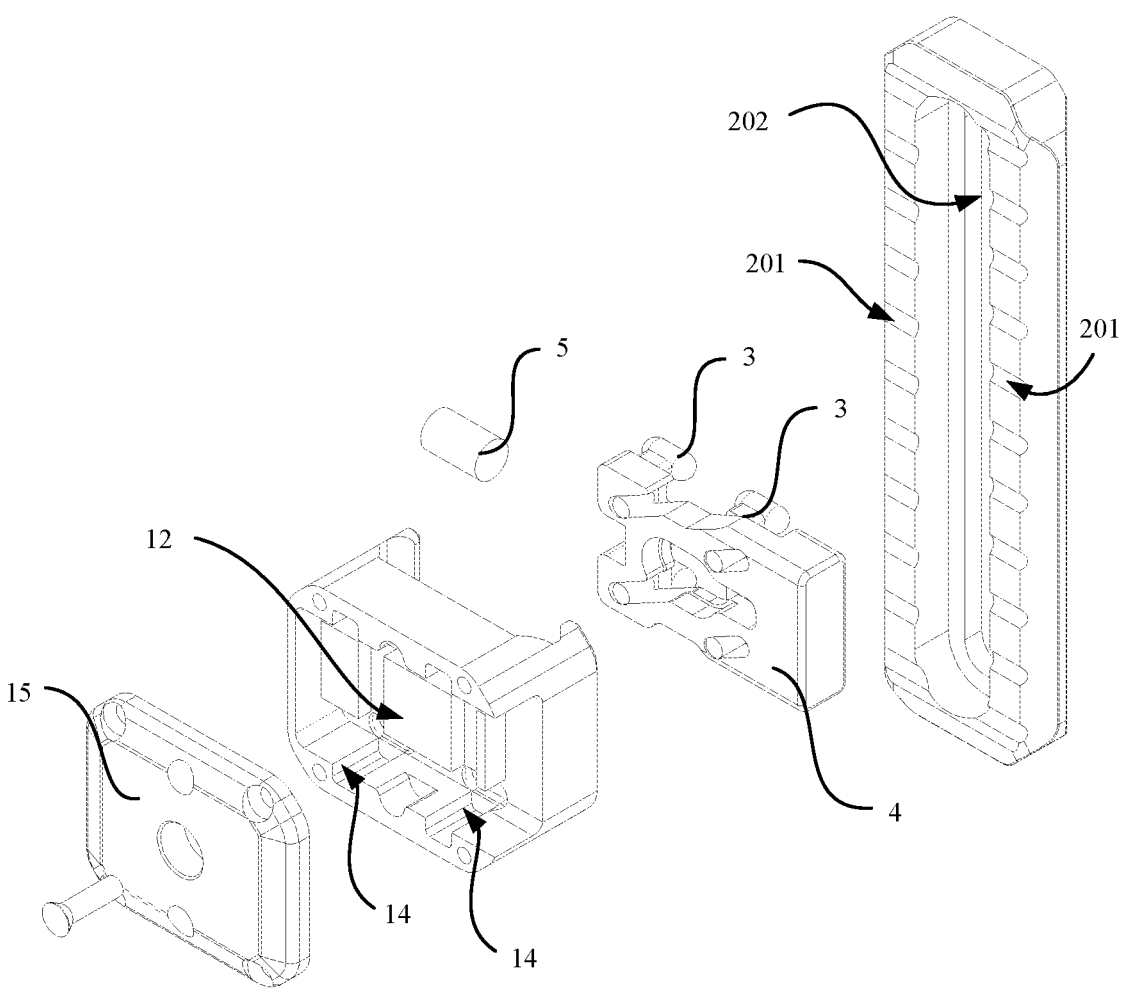
FIG. 3 is an exploded diagram of the quick-release assembly in FIG. 1.

According to some embodiments, the present disclosure provides a quick-release assembly. Referring to FIG. 1 to FIG. 3, the quick-release assembly includes a mounting base 1, a sliding member 2, and at least one resisting member 3. Atop end of the mounting base 1 is defined with a fixing slot 11 running left and right. The bottom end of the mounting base 1 is defined with an accommodation slot 12. The sliding member 2 is slidably accommodated in the accommodation slot 12. At least one limiting groove 13 is defined in the bottom wall of the fixing slot 11. An open at one end of the limiting groove 13 is communicated with the accommodation slot 12, and an open at the other end of the limiting groove 13 is communicated with the fixing slot 11. One resisting member 3 is received in one limiting groove 13. After assembly, one end of the resisting member 3 abuts against the sliding member 2, and the other end of the resisting member 3 extends out of the bottom wall surface of the fixing slot 11. The sliding member 2 is operated to slide to a first position to allow the sliding member 2 to release the resisting member 3. When the sliding member 2 is released, the sliding member 2 drives the resisting member 3 to reset.

The quick-release assembly is configured to be detachably connected with a structural member 200, such as a first photographic assembly. The structural member 200 includes a first frame, which is transversely defined with a plurality of engaging grooves 201 arranged in parallel and at intervals. The first frame passes through the fixing slot 11 in a left-right direction, such that the first frame is limited in the fixing slot 11 in an up-down direction.

In some embodiments, the first frame may be in a clearance fit with the inner wall of the fixing slot 11. Two opposite side walls of the fixing slot 11 are located on two sides of the first frame. Each of the two opposite side walls of the fixing slot 11 is protruded with a retaining part. The two retaining parts extend toward the inside of the fixing slot 11 to prevent the two sides of the first frame from being separated from the upper side of the fixing slot 11.

When assembling, the sliding member 2 is operated to slide to the first position so as to release all the resisting members 3. After the pressing force applied by the sliding member 2 disappears, all the resisting members 3 can retreat into the limiting grooves 13. Therefore, in the process of the first frame sliding into the fixing slot 11 from the opening on one side of the fixing slot 11, the surface of the first frame pushes the resisting members 3 into the limiting grooves 13, and the surface of the first frame slides along the peripheral surfaces of the resisting members 3. After the first frame slides to the preset position, the sliding member 2 is released to drive the resisting members 3 to reset. In the resetting process of the resisting members 3, each resisting member 3 slides along the inner wall of one avoidance groove 21 to the top surface adjacent to the opening of the avoidance groove 21, and is gradually inserted in one engaging groove 201. In this way, the first frame is fixed in the horizontal direction, which achieves locking of the first frame on the mounting base 1. The resisting members 3 abut between the first frame and the mounting base 1, so that the mounting base 1 provides a bearing force on the structural member 200 in the vertical direction, which prevents shaking between the first frame and the mounting base 1. The quick-release assembly provided by the present disclosure is easy to operate and has the advantage of simple structure, thereby improving the user experience.

When disassembling, the sliding member 2 is operated to slide to the first position so as to release all the resisting members 3. After the pressing force applied by the sliding member 2 disappears, the resisting members 3 release the first frame. In the process of the first frame sliding out of the fixing slot 11, the surface of the first frame slides along all the resisting members 3, and also the resisting members 3 are disengaged from the engaging grooves 201 of the first frame and retreat into the limiting grooves 13. After the first frame slides out of the fixing slot 11, the sliding member 2 is released and drives the resisting members 3 to reset.

An elastic member 5 may be provided to control the sliding member 2 to press the resisting member 3, so that the resisting member 3 extends out of the bottom wall surface of the fixing slot 11, thereby locking the first frame. The elastic member 5 may be a spring, such as a compression spring or a tension spring. The elastic member 5 applies a force on the sliding member 2 that maintains the sliding member 2 in an initial state, to allow the sliding member 2 to press the resisting member 3. When the sliding member 2 slides to the first position, the elastic member 5 is stretched to generate a stretching force; and after the sliding member 2 is released, the elastic member 5 pulls the sliding member 2 to slide back to the initial position. The elastic member 5 may be compressed between the sliding member 2 and the mounting base 1. For example, the side of the sliding member 2 away from the resisting members 3 is provided with a protrusion part, which extends out of the mounting base 1 and is configured for a user to hold. The elastic member 5 is disposed between the protrusion part and the mounting base 1.

The elastic member 5 is disposed between an end of the sliding member 2 in the sliding direction and the mounting base 1. The other end of the sliding member 2 is protruded with a pressing part located outside the mounting base 1.

The sliding member 2 may be driven by a cam which is in an asymmetric circular shape and rotatably connected with the mounting base 1. The cam is configured to drive the sliding member 2 to move close to the limiting grooves 13 so as to press the resisting members 3, or move away from the limiting grooves 13 so as to release the resisting members 3. Alternatively, the sliding member 2 may be driven by a pressing component and the elastic member 5. For example, the elastic member 5 is compressed between one end of the sliding member 2 and the inner side wall of the accommodation slot 12, and extends along the sliding direction of the sliding member 2. The other end of the sliding member 2 includes a first inclined surface. The pressing component includes a button member and a second elastic member. One end of the button member is connected with the second elastic member, and the other end of the button member is provided with a button part which extends out of the mounting base 1. The end of the button member provided with the button part includes a second inclined surface. When a user presses the button part, the second elastic member is compressed, and at the same time, the second inclined surface slides with the first inclined surface of the sliding member 2 to reduce the thickness of the button member located between the mounting base 1 and the first inclined surface of the sliding member 2, such that the elastic member 5 pushes the sliding member 2 to further approach the second inclined surface.

The mounting base 1 may be provided integrally or separately. The two side walls of the fixing slot 11 may be movable or fixedly connected. The mounting base 1 further includes a back cover 15. The back cover 15 covers the opening of the accommodation slot 12, so as to close the resisting members 3 and the sliding member 2 in the accommodation slot 12. The front end of the mounting base 1 may fit the shape of the first frame of the structural member 200. For example, the outer surface of the first frame of the structural member 200 facing the front end of the mounting base 1 may be a flat surface, and the surface of the front end of the mounting base 1 may be a flat surface. In case there are a plurality of limiting grooves 13, the plurality of limiting grooves 13 may be arranged in the same row or the same column. The sliding member 2 may be elongated. The plurality of limiting grooves 13 may be arranged in multiple rows or columns, and the limiting grooves 13 in two adjacent rows or columns may be arranged in a staggered manner or in a collinear manner. The sliding member 2 may be in the shape of a fork or a comb. Also, there may be a plurality of sliding members 2. The resisting member 3 may be a ball or a cylindrical member; and correspondingly, the limiting groove 13 is a round-hole groove or a transverse cylindrical groove. This is beneficial to the sliding of the first frame and thereby reducing the friction. Two ends of the cylindrical member may be arc-shaped surfaces.

The mounting base 1 is further connected to a second photography assembly, so as to achieve a fixed connection between the first photography assembly and the second photography assembly. In some embodiments, the back cover 15 of the mounting base 1 may be defined with a plurality of threaded holes for the connection of the second photography assembly. The mounting base 1 may be connected to the second photography assembly by means of a clamping component, a snap-fit interface, an ARRI interface, a slider interface, or the like. The second photography assembly may also be fixedly connected to the mounting base 1.

The first photography assembly and the second photography assembly may be accessories for assisting an electronic device in photographing. The first photographic assembly may be a slider, a camera protective housing, a L plate, an adapter plate, or the like. The camera protective housing may be a half cover housing or a full cover housing. The first frame may be detachably or non-detachably connected, to facilitate the connection with the mounting base 1. The first frame of the camera protective housing may be integrally provided in case the slot walls of the fixing slot 11 of the mounting base 1 are openable. The second photography assembly may be a side handle, a top handle, a microphone holder, or the like. In case the first photography assembly is a slider, the slider may be connected with another photography accessory by a screw. The slider is defined with a sliding slot 202. One end of the screw passes through the sliding slot 202 to screw the slider on the first frame of the camera protective housing. For a more stable connection of the slider, two or more screws may be fixed in the sliding slot 202. The positions of the screws in the sliding slot 202 are adjustable, so as to adapt to different spacing of screw holes, thereby improving applicability. Two ends of the sliding slot 202 may be disposed close to two ends of the first frame in the length direction, so that the weight of the first frame is reduced, and the engaging grooves in the first frame are allowed to be arranged in two rows.

Figure 4:
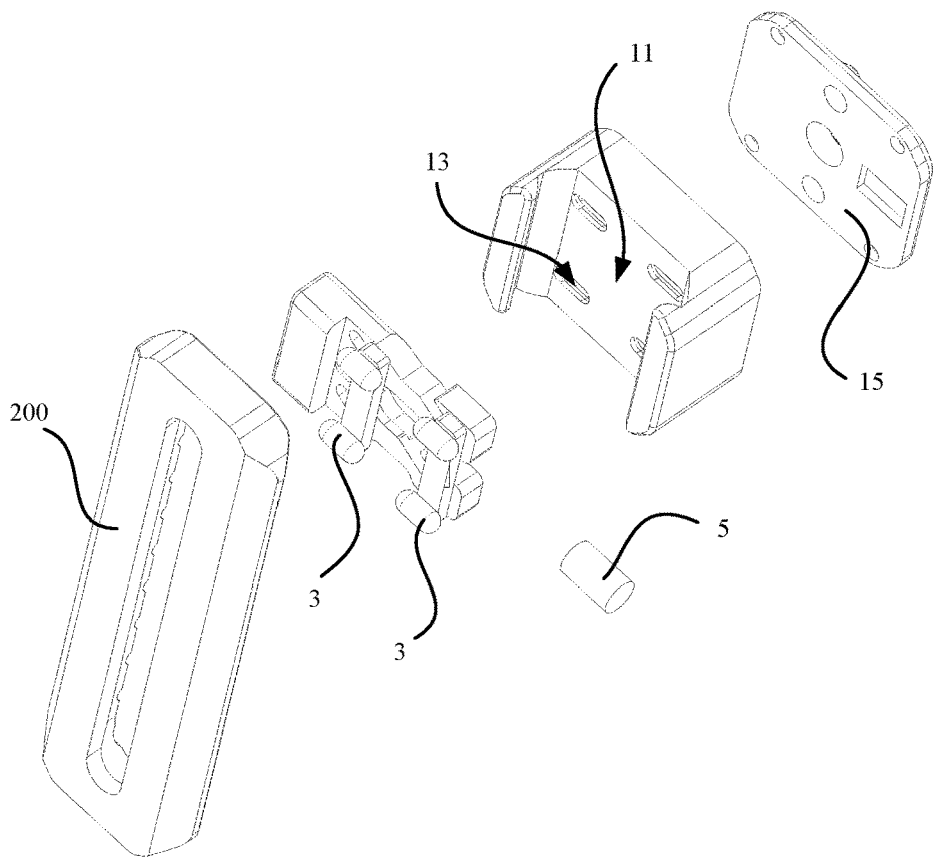
FIG. 4 is an exploded diagram of the quick-release assembly in FIG. 1 from another perspective.
Figure 8:
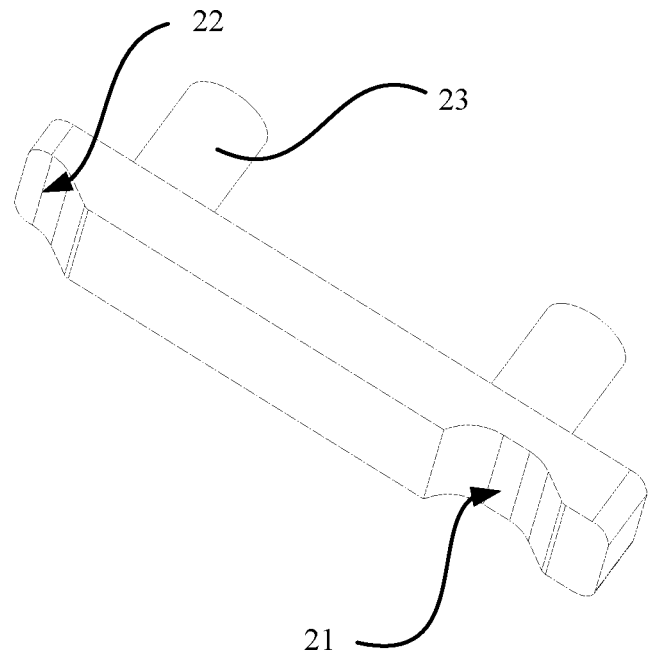
FIG. 8 is a structural schematic diagram of a sliding member of the quick-release assembly according to an embodiment of the present disclosure.

In some embodiments, referring to FIG. 4 and FIG. 8, the side surface of the sliding member 2 facing the resisting member 3 is recessed with an avoidance groove 21. When the sliding member 2 slides, the resisting member 3 slides into or out of the avoidance groove 21, such that when the sliding member 2 slides to the first position, the resisting member 3 and the avoidance groove 21 are distributed in the up-down direction. That is, the avoidance groove 21 reaches the position of the resisting member 3. The number of the avoidance grooves 21 matches the number of the resisting members 3. In order to lock the first frame, there may be more than two resisting members 3. The resisting members 3 may be arranged transversely, longitudinally, in lines or in a linear manner, which is not limited herein. This makes the structure simple and compact.

After assembly, the avoidance groove 21 is staggered with respect to the limiting groove 13, the lower end of the resisting member 3 abuts against the sliding member 2. When the sliding member 2 is operated to slide along a first direction, the avoidance groove 21 is driven to move and gradually faces the limiting groove 13 in the up-down direction. As a result, the lower end of the resisting member 3 can fall into the avoidance groove 21, to release the first frame. After the sliding member 2 is released, the sliding member 2 slides along a second direction, and the avoidance groove 21 is gradually staggered with respect to the limiting groove 13 and the resisting member 3. The resisting member 3 slides along the inner wall of the avoidance groove 21 until it abuts against the end surface of the sliding member 2, to lock the first frame. The first direction may be opposite to the second direction, for example, the first direction is the direction of movement toward the front end of the mounting base 1, and the second direction is the direction of movement toward the rear end of the mounting base 1.

In order to reduce the thickness of the mounting base 1 in the up-down direction and thereby locking the first frame more stably, the resisting member 3 is configured to be cylindrical, which is easy for the sliding member to slide relative to the resisting member 3. The shape of the limiting groove 13 fits the resisting member 3, and the resisting member 3 is transversely received in the limiting groove 13, so that the outer peripheral surface of the resisting member 3 abuts against the first frame. The surface of the first frame is defined with a plurality of engaging grooves 201 arranged at intervals, and the engaging grooves 201 extend along the width direction of the first frame. The resisting members 3 extend along the front-rear direction of the mounting base 1, so as to reduce or avoid the vacant position between the first frame and the mounting base 1 in the left-right direction. Two rows of resisting members 3 may be provided along the left-right direction of the mounting base 1, and the resisting members 3 in the front row may be staggered or aligned with the resisting members 3 in the back row. In some embodiments, a long resisting member 3 is replaced by a plurality of short resisting members 3 that are collinear in their extending directions, which is easy for production and convenient for driving.

In some embodiments, in order to facilitate driving the sliding member 2, the quick-release assembly further includes an elastic member 5 and a driving member 4 slidably accommodated in the accommodation slot 12. The elastic member 5 may be a compression spring or a tension spring. The driving member 4 is located on the side of the sliding member 2 away from the resisting member 3, to limit the sliding member 2 between the resisting member 3 and the driving member 4. In this way, the elastic member 5, the sliding member 2, and the driving member 4 abut against with one another. The elastic member 5 applies a force on the driving member 4 to push the sliding member 2 against the resisting member 3. One end of the driving member 4 extends out of the accommodation slot 12 for a user to operate. The driving member 4 is connected with the sliding member 2 by way of at least one slant groove 41 and at least one driving part 23. A free end of each driving part 23 is inserted into one slant groove 41.

One end of the driving member 4 may extend out of the left side, right side, front side, or rear side of the mounting base 1, preferably, the front side or the rear side of the mounting base 1, which facilitates a user to press. The mounting base 1 further includes the back cover 15, which covers the opening of the accommodation slot 12. In some other embodiments, one end of the driving member 4 may extend out of the back cover 15 of the mounting base 1. The driving member 4 is actuated by pressing the end of the driving member 4 that extends out of the mounting base 1. The inner wall of the accommodation slot 12 limits the driving member 4, to prevent the driving member 4 from escaping from the accommodation slot 12.

In some embodiments, the elastic member 5 is a compression spring, which is compressed between the other end of the driving member 4 and the wall of the accommodation slot 12. The compression spring is compressed when the end of the driving member 4 is pressed. When the driving member 4 slides, the inner wall of the slant groove 41 pushes the driving part 23 to move, so as to drive the sliding member 2 to slide along the first direction, and at the same time, the sliding member 2 drives the avoidance groove 21 to move, such that the avoidance groove 21 gradually faces the limiting groove 13 in the up-down direction. As a result, the resisting member 3 releases the first frame, and a part of the resisting member 3 can fall into the avoidance groove 21, thereby unlocking the first frame.

Figure 5:
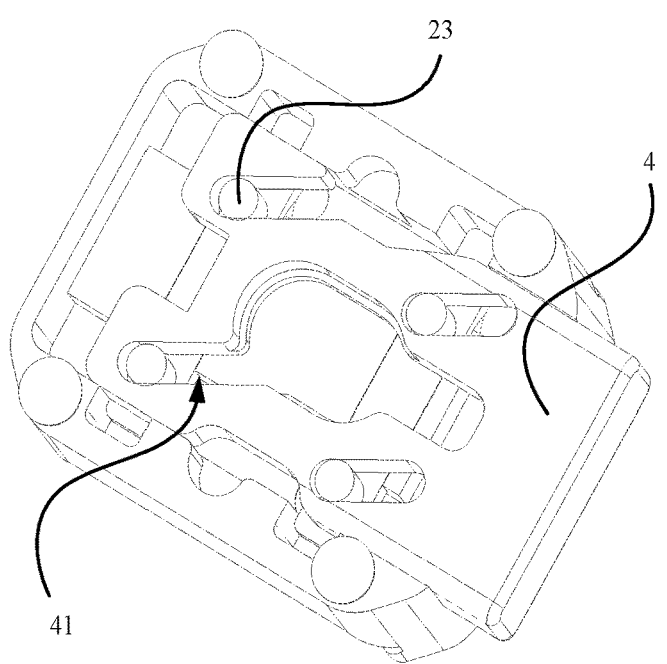
FIG. 5 is a structural schematic diagram of a part of a quick-release assembly according to an embodiment of the present disclosure.
Figure 6:
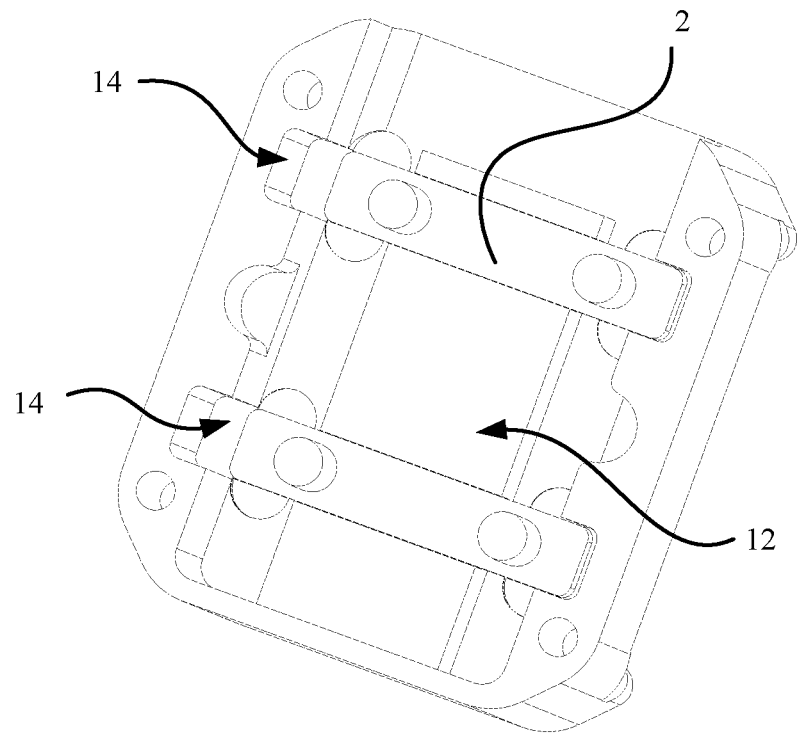
FIG. 6 is a structural schematic diagram of the other part of the quick-release assembly according to an embodiment of the present disclosure.
Figure 7:
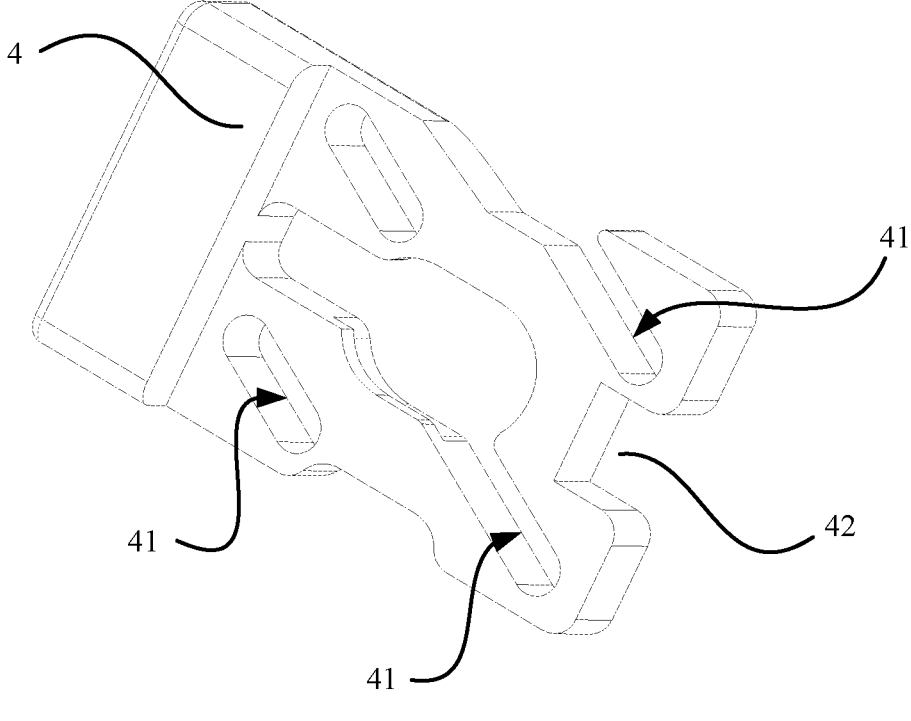
FIG. 7 is a structural schematic diagram of a driving member of the quick-release assembly according to an embodiment of the present disclosure.

In some embodiments, referring to FIG. 5 to FIG. 7, the sliding member 2 is defined with the slant groove 41, and the driving member 4 is protruded with the driving part 23. The driving part 23 may be cylindrical. In some embodiments, the driving member 4 is defined with at least one slant groove 41, and the side surface of the sliding member 2 away from the avoidance groove 21 is defined with at least one driving part 23. When the driving member 4 slides, the driving part 23 slides along the inner wall of the slant groove 41 to push the sliding member 2 to slide.

After assembly, one end of the driving member 4 is located outside the mounting base 1, and the elastic member 5 is connected between the other end of the driving member 4 and the inner wall of the accommodation slot 12. The number of the elastic member 5 is not limited herein. The driving part 23 is located at one end of the slant groove 41. In the process of pressing the driving member 4, the slant groove 41 moves together with the driving member 4 when the driving member 4 slides in the accommodation slot 12, such that the inner wall of the slant groove 41 pushes the driving part 23 to slide, and therefore the driving part 23 drives the sliding member 2 to slide along the first direction. To ensure the stability of the elastic member 5, the other end of the driving member 4 is defined with a notch 42, and one end of the elastic member 5 is accommodated in the notch 42.

As shown in FIG. 5, the driving member 4 extends along the front-rear direction of the mounting base 1, the sliding direction of the sliding member 2 is substantially perpendicular to the sliding direction of the driving member 4, and the extending direction of the slant groove 41 is respective at an included angle with the sliding direction of the sliding member 2 and the sliding direction of the driving member 4. In order to ensure no deviation occurs when the sliding member 2 slides, the inner wall of the accommodation slot 12 is recessed to form recesses 14, and two ends of the sliding member 2 are slidably received in the recesses 14. The driving member 4 is in a clearance fit with the inner wall of the accommodation slot 12.

To reduce the weight, the quick-release assembly includes two sliding members 2 arranged in parallel and spaced apart. Each sliding members 2 is elongated. The driving member 4 simultaneously drives the two sliding members 2. Compared with proving an integral sliding member 2, the two sliding members 2 help to reduce the weight and occupy less volume. One end of the slant groove 41 may define an opening for easy installation. The driving member 4 may be in the shape of a rectangular plate, in the center of which a weight reduction slot may be defined.

Further, each sliding member 2 is provided with two driving parts 23 spaced apart. The driving member 4 is defined with four slant grooves 41 spaced apart, and the four slant grooves 41 extend in the same direction. The two driving parts 23 spaced apart may be located at positions close to two ends of the sliding member 2. The number of the driving parts 23 may be set according to actual requirements. When pressing the driving member 4, the four slant grooves 41 synchronously drive the four driving parts 23 to slide, so as to drive the sliding members 2 to move.

In some embodiments, the avoidance groove 21 is transversely formed in the sliding member 2, and the avoidance groove 21 has two ends with each defining an opening. Each sliding member 2 is defined with at least two avoidance grooves 21. One of the at least two avoidance grooves 21 is formed at an end of the sliding member 2 and called an end avoidance groove 22. The end avoidance groove 22 is defined by an arc side wall and a bottom wall. The bottom wall of the end avoidance groove 22 extends out of the end of the sliding member 2, which simplifies the structure of the sliding member 2. The arc side wall of the end avoidance groove 22 and the inner wall of the accommodation slot 12 clamp and fix the resisting member 3. In some other embodiments, the top end of the mounting base 1 or the surface of the first frame is attached with an elastic pad, which may be a sponge pad or a silicone pad.

To sum up, preferably, the driving member 4 extends out of the front end of the mounting base 1, the driving member 4 extends along the front-rear direction of the mounting base 1, the sliding members 2 extend along the left-right direction of the mounting base 1, the resisting members 3 extend along the front-rear direction of the mounting base 1, and the limiting grooves 13, the avoidance grooves 21 and the engaging grooves 201 extend along the front-rear direction of the mounting base 1. The quick-release assembly includes two sliding members 2. Each sliding member 2 is provided with two driving parts 23, and the driving member 4 is defined with four slant grooves 41.

After assembly, the avoidance grooves 21 are staggered with respect to the limiting grooves 13, the lower outer surfaces of all the resisting members 3 abut against the end surfaces of the sliding members 2, the upper outer surfaces of all the resisting members 3 protrude from the surface of the fixing slot 11, and the elastic member 5 is compressed between the driving member 4 and the inner wall of the accommodation slot 12. As an example, the elastic member 5 is illustrated by a cylinder in the figures.

When the sliding member 2 is operated to slide along the first direction, the avoidance grooves 21 are driven to move and gradually face the limiting grooves 13 in the up-down direction, so that the lower ends of the resisting members 3 can fall into the avoidance grooves 21, thereby allowing the resisting members 3 to release the first frame.

When assembling, in the process of pressing the driving member 4 to make it move to the rear end of the mounting base 1, the elastic member 5 is compressed. The four slant grooves 41 of the driving member 4 respectively push the four driving parts 23 to slide to the left side of the mounting base 1, such that the two sliding members 2 slide to the left side of the mounting base 1. At the same time, the four avoidance grooves 21 gradually move to the positions of the four resisting members 3. When the sliding members 2 slide to the first position, the four avoidance grooves 21 are all located directly below the four resisting members 3, so as to allow the sliding members 2 to release the four resisting members 3. Then, in the process of the first frame sliding into the fixing slot 11 from the opening on one side of the fixing slot 11, the surface of the first frame slides along the peripheral surfaces of the resisting members 3, such that the surface of the first frame pushes the four resisting members 3 into the four limiting grooves 13, and the peripheral surfaces of the lower ends of the resisting members 3 are received in the avoidance grooves 21. In the process of releasing the driving member 4 after the first frame slides to the preset position, the elastic member 5 pushes the driving member 4 to reset, and further the driving member 4 drives the two resisting members 2 to reset. At the same time, each resisting member 3 slides along the inner wall of one avoidance groove 21 to the top surface adjacent to the opening of the avoidance groove 21, and is gradually inserted into one engaging groove 201 to abut against the inner surface of the engaging groove 201, realizing the installation and fixation of the first frame.

When disassembling, the driving member 4 is pressed again to move to the rear end of the mounting base 1, and the elastic member 5 is compressed. The four slant grooves 41 of the driving member 4 respectively push the four driving parts 23 to slide to the left side of the mounting base 1, such that the two sliding members 2 slide to the left side of the mounting base 1. At the same time, the four avoidance grooves 21 gradually move to the positions of the four resisting members 3. When the sliding members 2 slide to the first position, the four avoidance grooves 21 are all located directly below the four resisting members 3, so as to allow the sliding members 2 to release the four resisting members 3. As a result, the resisting members 3 no longer press against the first frame. In this case, the first frame can be removed from the opening on one side of the fixing slot 11, realizing detachment. After the driving member 4 is released, the sliding members 2 and the resisting members 3 reset.

Figure 9:
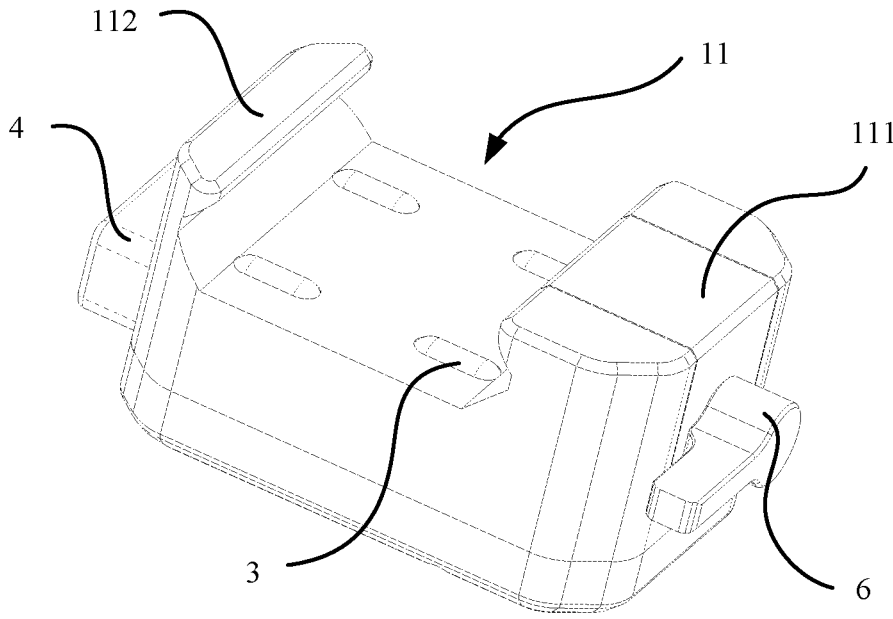
FIG. 9 is a structural schematic diagram of a quick-release assembly according to an embodiment of the present disclosure.
Figure 10:
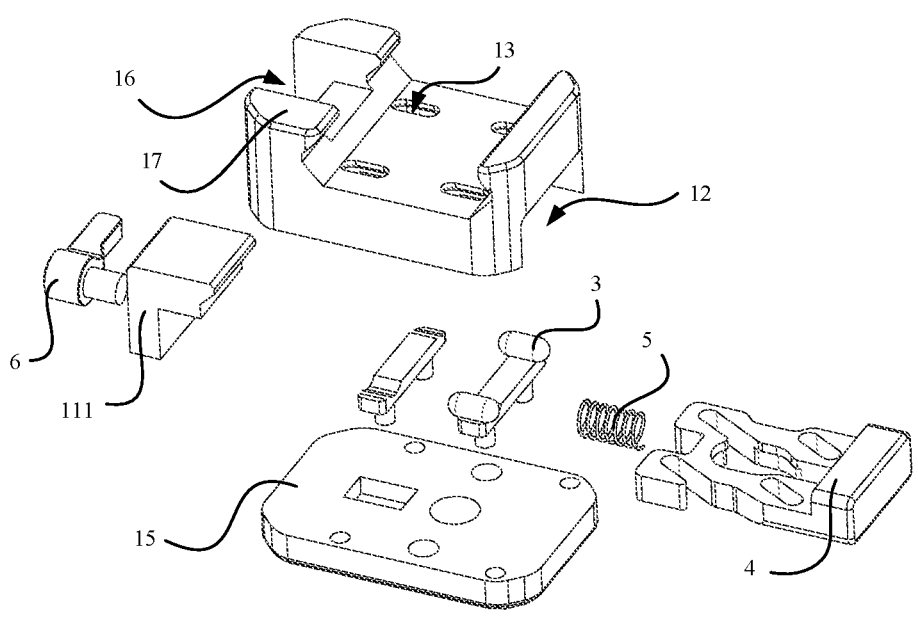
FIG. 10 is an exploded diagram of a locking component according to an embodiment of the present disclosure.
Figure 11:
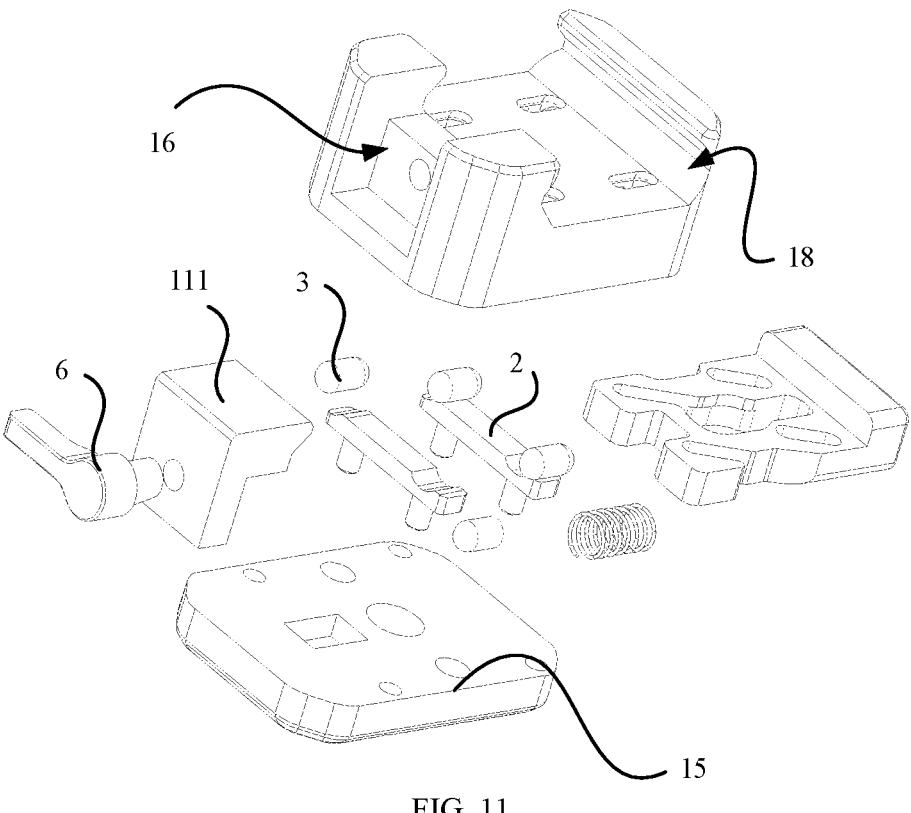
FIG. 11 is another exploded diagram of a locking component according to an embodiment of the present disclosure.

In some embodiments, referring to FIG. 9 to FIG. 11, the top end of the mounting base 1 is provided with a first side plate 111 and a second side plate 112 facing each other. The fixing slot 11 is defined by the first side plate 111 and the second side plate 112. The first side plate 111 or the second side plate 112 is movable, or both the first side plate 111 and the second side plate 112 are movable, so as to open or close the fixing slot 11.

When the fixing slot 11 is opened, the first frame may be placed in a vertical direction, and there is no need to pass the first frame through the opening at one side of the fixing slot, which prevents interference with other accessories or structures on the first frame. When the fixing slot 11 is closed, the first frame can be limited in the fixing slot 11 in the up-down direction. The first frame may be in a clearance fit with the inner wall of the fixing slot 11. The first side plate 111 and the second side plate 112 are located on two sides of the first frame. Each of the first side plate 111 and the second side plate 112 is provided with a retaining part. The two retaining parts extend toward the inside of the fixing slot 11 to prevent two side edges of the first frame from being separated from the upper side of the fixing slot 11. The two side edges of the first frame may be V-shaped. The first side plate 111 and the second side plate 112 are correspondingly defined with V-shaped grooves. Certainly, in case the opening area of the fixing slot 11 is relatively small, the first frame may slide into the fixing slot 11 from the opening on one side of the fixing slot 11. The relative motion between the first side plate 111 and the second side plate 112 is adapted to first frames with different widths, thereby improving applicability.

When assembling, the relative motion between the first side plate 111 and the second side plate 112 allows the fixing slot 11 to be opened. The sliding member 2 is operated to slide to the first position so as to release all the resisting members 3. After the pressing force applied by the sliding member 2 disappears, the resisting members 3 can retreat into the limiting grooves 13. Therefore, when the first frame enters the fixing slot 11 from the upper side of the fixing slot 11, the surface of the first frame pushes the resisting members 3 into the limiting grooves 13. After the relative motion between the first side plate 111 and the second side plate 112 that allows the fixing slot 11 to be closed, the sliding member 2 is released. In the process of the sliding member 2 driving the resisting members 3 to reset, each resisting member 3 slides along the inner wall of one avoidance groove 21 to the top surface adjacent to the opening of the avoidance groove 21, and is gradually inserted into one engaging groove 201. In this way, the first frame is fixed in the horizontal direction, which archives locking of the first frame on the mounting base 1. The resisting members 3 abut between the first frame and the mounting base 1, so that the mounting base 1 provides a bearing force on the structural member 200 in the vertical direction, to prevent shaking between the first frame and the mounting base 1. The quick-release assembly provided by the present disclosure is easy to operate and has the advantage of simple structure, thereby improving the user experience.

When disassembling, the sliding member 2 is operated to slide to the first position, so as to release all the resisting members 3. After the pressing force applied by the sliding member 2 disappears, the resisting members 3 release the first frame. In the process of the first frame sliding out from the upper side of the fixing slot 11, the surface of the first frame slides along all the resisting members 3, and also the resisting members 3 are disengaged from the engaging grooves 201 of the first frame and retreat into the limiting grooves 13. Alternatively, the relative motion between the first side plate 111 and the second side plate 112 allows the fixing slot 11 to be opened, so that the first frame is separated from the fixing slot 11 from the side of the fixing slot 11. After the first frame is separated from the fixing slot 11, the sliding member 2 is released to drive the resisting members 3 to reset.

The first side plate 111 may be fixed, and the second side plate 112 is movable relative to the first side plate 111. Or, the second side plate 112 may be fixed, and the first side plate 111 is movable relative to the second side plate 112. Or, the first side plate 111 and the second side plate 112 are both movable or rotatable relative to the mounting base 1. The first side plate 111 may be located at the front end of the mounting base 1, and the second side plate 112 may be located at the rear end of the mount base 1.

As shown in FIG. 5, the second side plate 112 is fixed, and the first side plate 111 is movable relative to the second side plate 112. The side wall of the first side plate 111 is mounted with an adjustment screw rod 6 and a through hole, and the side wall of the mounting base 1 is defined with a threaded hole coaxial with the through hole. The adjustment screw rod 6 passes through the first side plate 111 and is threadedly connected with the mounting base 1. The adjustment screw rod 6 passes through the through hole and is threadedly connected with the threaded hole. The head portion of the adjustment screw rod 6 is exposed on the outer surface of the first side plate 111 for a user to screw. The user may adjust the spacing between the first side plate 111 and the second side plate 112 based on the width of the first frame, so that the first frame is slidably received in the fixing slot after entering between the first side plate 111 and the second side plate 112 from above the fixing slot 11. After the resisting members 3 are adjusted to correspond to the engaging grooves 201, the adjustment screw rod 6 is screwed into the mounting base 1 for a preset length, so that both the first side plate 111 and the second side plate 112 can abut against the two side edges of the first frame, realizing a stable connection of the first frame.

Alternatively, the user may adjust the spacing between the first side plate 111 and the second side plate 112 based on the width of the first frame, such that the spacing between the first side plate 111 and the second side is substantially the same with the width of the first frame. Then, when the first frame slides into the fixing slot 11 from the opening on one side of the fixing slot 11, the two side edges of the first frame are received in the V-shaped grooves. After the first frame slides to the preset position, the sliding member 2 is released and drives the resisting members 3 to reset. In some embodiments, the first side plate 111 may be further fine-tuned. The quick-release assembly has the advantages of high reliability, simple operation, and convenient adjustment.

The adjustment screw rod 6 may be further sleeved with an elastic element for pushing the first side plate 111 to move away from the second side plate 112. One end of the elastic element abuts against the first side plate 111, and the other end of the elastic element abuts against the mounting base 1. In an initial state, the spacing between the first side plate 111 and the second side plate 112 is minimum, and the elastic element is in a compressed state. In case the spacing between the first side plate 111 and the second side plate 112 needs to be adjusted, the adjustment screw rod 6 may be screwed out of a preset length. In the process of unscrewing the adjustment screw rod 6, the elastic member applies a force on the first side plate 111 that makes the first side plate 111 move away from the second side plate 112.

For another example, the first side plate 111 or the second side plate 112 is rotatable, or both the first side plate 111 and the second side plate 112 are rotatable. The first side plate 111 and/or the second side plate 112 may be rotatably connected to the mounting base 1 through a shaft rod. The first side plate 111 is L-shaped. The first side plate 111 includes a first connection part and a second connection part. The shaft rod is located at an intersection area of the first connection part and the second connection part. The shaft rod is mounted on the mounting base 1. The second connection part forms the side wall of the fixing slot 11. The lower side of the first connection part further abuts against an elastic member, which applies a force on the first connection part that allows the first connection part to move away from the second side plate 112.

In some embodiments, the first side plate 111 may be a part of the side wall of the fixing slot 11. First side walls 17 are disposed on two sides of the first side plate 111, and a mounting notch 16 is defined between the two first side walls 17. The first side plate 111 is L-shaped and received in the mounting notch 16. The adjustment screw rod 6 in the figures is illustrated as an example, and the rod of the adjustment screw rod 6 is not marked with threads.

When assembling, a user adjusts the spacing between the first side plate 111 and the second side plate 112 based on the width of the first frame. In the process of pressing the driving member 4 to move to the rear end of the mounting base 1, the elastic member 5 is compressed. The four slant grooves 41 of the driving member 4 respectively push the four driving parts 23 to slide to the left side of the mounting base 1, to allow the two sliding members 2 to slide to the left side of the mounting base 1. At the same time, the four avoidance grooves 21 gradually move to the positions of the four resisting members 3. When the sliding members 2 slide to the first position, the four avoidance grooves 21 are all located directly below the four resisting members 3, such that the sliding members 2 release the four resisting members 3. Then, in the process of the first frame sliding into the fixing slot 11 from the opening on one side of the fixing slot 11, the surface of the first frame slides along the peripheral surfaces of the resisting members 3, such that the surface of the first frame pushes the four resisting members 3 into the four limiting grooves 13, and the peripheral surfaces of the lower ends of the resisting members 3 are accommodated in the avoidance grooves 21. In the process of releasing the driving member 4 after the first frame slides to the preset position, the elastic member 5 pushes the driving member 4 to reset, and further the driving member 4 drives the two sliding members 2 to reset. At the same time, each resisting member 3 slides along the inner wall of one avoidance groove 21 to the top surface adjacent to the opening of the avoidance groove 21, and is gradually inserted into one engaging groove 201 to abut against the inner surface of the engaging groove 201, realizing the installation and fixation of the first frame.

When disassembling, the driving member 4 is pressed again to move to the rear end of the mounting base 1, and the elastic member 5 is compressed. The four slant grooves 41 of the driving member 4 respectively push the four driving parts 23 to slide to the left side of the mounting base 1, such that the two sliding members 2 slide to the left side of the mounting base 1. At the same time, the four avoidance grooves 21 gradually move to the positions of the four resisting members 3. When the sliding members 2 slide to the first position, the four avoidance grooves 21 are all located directly below the four resisting members 3, to allow the sliding members 2 to release the four resisting members 3. As a result, the resisting members 3 no longer press against the first frame. In this case, the first frame can be removed from the opening on one side of the fixing slot 11, realizing detachment. After the driving member 4 is released, the sliding members 2 and the resisting members 3 reset.

Another way to assemble and disassemble is described below. When assembling, the user may adjust the spacing between the first side plate 111 and the second side plate 112 based on the width of the first frame, so as to place the first frame from the upper side of the fixing slot 11. In the process of pressing the driving member 4 to move to the rear end of the mounting base 1, the elastic member 5 is compressed. The four slant grooves 41 of the driving member 4 respectively push the four driving parts 23 to slide to the left side of the mounting base 1, such that the two sliding members 2 slide to the left side of the mounting base 1. At the same time, the four avoidance grooves 21 gradually move to the positions of the four resisting members 3. When the sliding member 2 slides to the first position, the four avoidance grooves 21 are located directly below the four resisting members 3, to allow the sliding members 2 to release the four resisting members 3. In this case, one side edge of the first frame is first clamped into the V-shaped groove of the second side plate 112, so as to allow the four limiting grooves 13 to face the four engaging grooves 201 in the up-down direction, and the other side edge of the first frame faces the opening of the V-shaped groove of the first side plate 111. The surface of the first frame pushes the four resisting members 3 to retreat into the four limiting grooves 13, and the peripheral surface of the lower end of each resisting member 3 is accommodated in one avoidance groove 21. After the driving member 4 is released, the elastic member 5 pushes the driving member 4 to reset. In the resetting process, the driving member 4 drives the two sliding members 2 to reset. At the same time, each resisting member 3 slides along the inner wall of one avoidance groove 21 to the top surface adjacent to the opening of the avoidance groove 21, and is gradually inserted into one engaging groove 201 to abut against the inner surface of the engaging groove 201. Then, the user screws the adjustment screw rod 6 again to clamp the other side edge of the first frame into the V-shaped groove of the first side plate 111, realizing the installation and fixation of the first frame.

When disassembling, the user screws the adjustment screw rod 6 again to make the other side edge of the first frame detached from the opening of the V-shaped groove of the first side plate 111, and presses the driving member 4 again to make the driving member 4 move to the rear end of the mounting base 1. The elastic member 5 is compressed, and the four slant grooves 41 of the driving member 4 respectively push the four driving parts 23 to slide to the left side of the mounting base 1, so that the two sliding members 2 slide to the left side of the mounting base 1. At the same time, the four avoidance grooves 21 gradually move to the positions of the four resisting members 3. When the sliding member 2 slides to the first position, the four avoidance grooves 21 are located directly below the four resisting members 3, to allow the sliding member 2 to release the four resisting members 3. As a result, the resisting members 3 no longer press against the first frame. In this case, the edge of the first frame close to the first side plate 111 first moves out from the opening on the upper side of the fixing slot, to drive the edge of the first frame close to the second side plate 112 to detach from the opening of the V-shaped groove of the second side plate 112 and move out from the opening on the upper side of the fixing slot, realizing the detachment of the first frame. After the driving member 4 is released, the sliding member 2 and the resisting member 3 are reset.

Figures 12, 13:
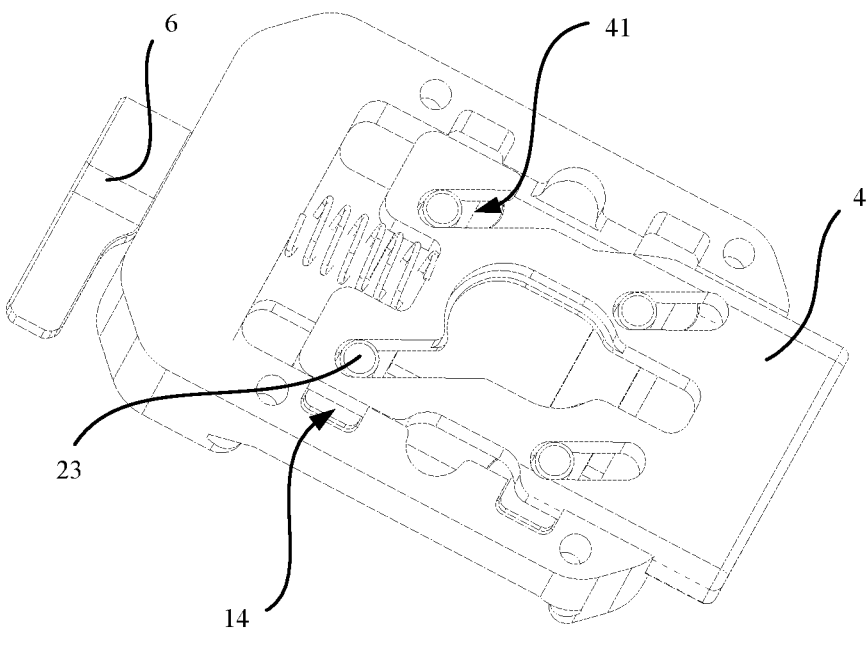
FIG. 12 is a structural schematic diagram of a part of a quick-release assembly according to an embodiment of the present disclosure.
FIG. 13 is a structural schematic diagram of a quick-release assembly being connected with a structural member according to an embodiment of the present disclosure.
Figure 14:
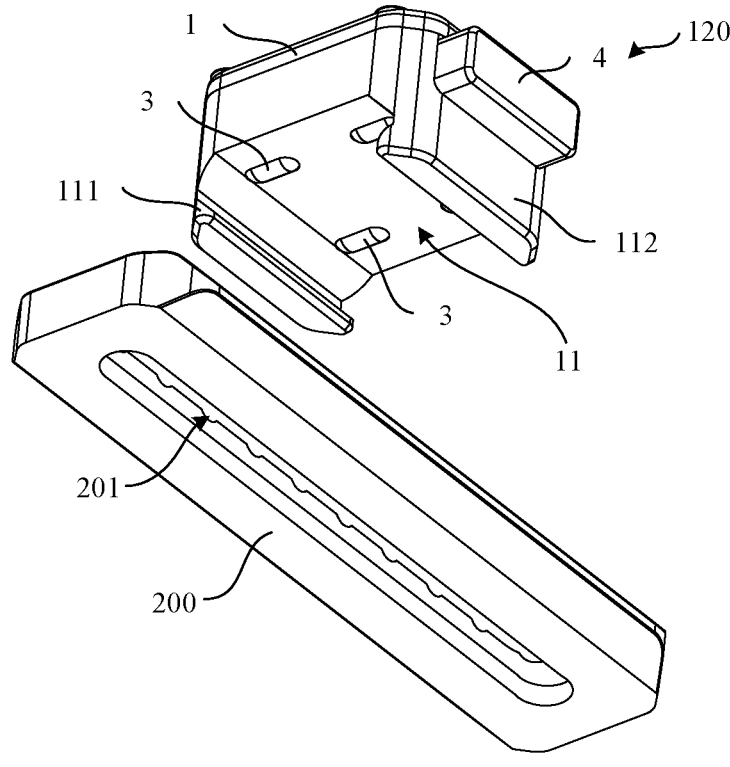
FIG. 14 is a structural schematic diagram of a quick-release assembly being detached from a structural member according to an embodiment of the present disclosure.
Figure 15:
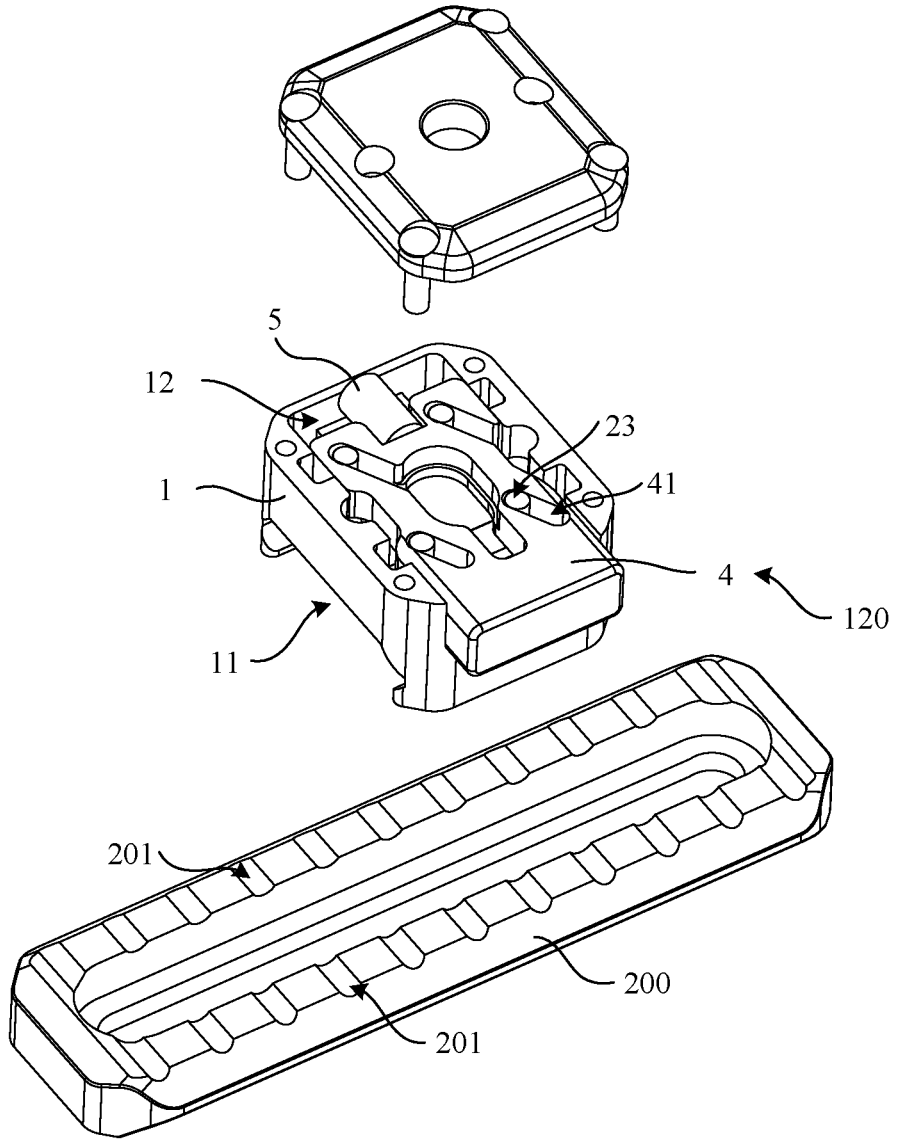
FIG. 15 is an exploded diagram of a quick-release assembly being detached from a structural member according to an embodiment of the present disclosure.

According to some other embodiments, the present disclosure further provides a quick-release assembly. Referring to FIG. 13 to FIG. 15, the quick-release assembly includes a mounting base 1. The mounting base 1 is defined with a fixing slot 11 through which the mounting base 1 is sleeved on a structural member 200. The structural member 200 is defined with an engaging groove 201. An actuation structure 120, an elastic member 5, and a resisting member 3 are provided on the mounting base 1. The resisting member 3 is exposed on the side wall of the fixing slot 11 and fits the engaging groove 201. The actuation structure 120 is movably disposed on the mounting base 1. The elastic member 5 applies a force on the actuation structure 120 to reset the actuation structure 120.

The quick-release assembly has an unlocked state and a locked state. In the unlocked state, the actuation structure 120 releases the resisting member 3 to allow the resisting member 3 to be disengaged from the engaging groove 201. In the locked state, the actuation structure 120 resets and presses the resisting member 3 to allow the resisting member 3 to be engaged in the engaging groove 201.

The quick-release assembly in the embodiments is applied to photography equipment, so as to connect photography devices (also called photography accessories) of the photography equipment. Specifically, in an actual application, two photography devices (hereinafter referred to as a first device and a second device) may be connected by connecting the quick-release assembly with a structural member 200. The first device is connected to the quick-release assembly by means of a screw connection, a snap-fit connection, or the like. For example, as shown in FIG. 13, the mounting base 1 of the quick-release assembly is defined with a connection hole 113, and a fastener is fastened through the connection hole 112 to connect the first device. The second device is the structural member 200. That is, the first device is connected to the quick-release assembly, and the quick-release assembly is connected to the structural member 200 (namely, the second device), realizing the connection between the two devices. Alternatively, the structural member 200, as an intermediate device, is connected to the second device by means of a screw connection, a snap-fit connection, or the like. That is, the first device is connected to the quick-release assembly, the second device is connected to the structural member 200, and the quick-release assembly is connected to the structural member 200, realizing the connection between the two devices. The external shape of the structural member 200 is not limited herein, and may be set according to actual situations.

The fixing slot 11 may be located on one side of the mounting base 1. The fixing slot 11 fits the structural member 200. When sleeving the mounting base 1 on the structural member 200, the structural member 200 passes through the opening at one end of the fixing slot 11 and out of the opening at the other end of the fixing slot 11. The resisting member 3 is configured to be engaged in the engaging groove 201 of the structural member 200 when the mounting base 1 is sleeved on the structural member 200. The actuation structure 120 is configured to drive the resisting member 3 to move. The actuation structure 120 may have various structural forms, such as, a single structure or a combined structure, which may be set according to actual conditions. In some embodiment, the elastic member 5 is a spring. There may be one or more springs, which may be set according to actual situations.

When the resisting member 3 is engaged in the engaging groove 201, the mounting base 1 is fixed on the structural member 200; and when the resisting member 3 is not engaged in the engaging groove 201, the mounting base 1 is slidable on the structural member 200. Specifically, in the unlocked state, the actuation structure 120 on the mounting base 1 releases the resisting member 3, so that the resisting member 3 is disengaged from the engaging groove 201 of the structural member 200, and as a result, the quick-release assembly is separated from the structural member 200. In the locked state, the actuation structure 120 on the mounting base 1 resets and presses the resisting member 3, so that the resisting member 3 is engaged in the engaging groove 201 of the structural member 200, and as a result, the quick-release assembly is stably connected with the structural member 200. In this way, two devices can be tightly connected or quickly separated, thereby improving the user experience.

In some embodiments, referring to FIG. 13 to FIG. 15, the mounting base 1 is defined with an accommodation slot 12, and the actuation structure 120 includes a sliding member 2 and a driving member 4.

The sliding member 2 is slidably disposed in the accommodation slot 12. The resisting member 3 is located on a sliding path of the sliding member 2. The sliding member 2 is configured to press or release the resisting member 3.

The driving member 4 slidably penetrates into the accommodation slot 12 and is at least partially exposed outside the mounting base 1. The sliding member 2 and the driving member 4 are in a motion fit with each other.

One end of the elastic member 5 abuts against the driving member 4, and the other end of the elastic member 5 abuts against the side wall of the accommodation slot 12.

In the embodiments, the driving member 4 is pressed to slide forward, so as to drive the sliding member 2 to slide. In the sliding process, the sliding member 2 releases the resisting member 3, so that the resisting member 3 is disengaged from the engaging groove 201. This realizes unlocking. As a result, the quick-release assembly can be separated from the structural member 200. After the driving member 4 is released, under the action of the elastic member 5, the driving member 4 slides backward, so as to drive the sliding member 2 to slide. In the sliding process, the sliding member 2 presses the resisting member 3, so that the resisting member 3 is engaged in the engaging groove 201. This realizes locking. As a result, the quick-release assembly is fixed on the structural member 200.

In some embodiments, the mounting base 1 includes a base body and a base cover. The accommodation slot 12 is formed on the base body. The base cover is mounted on the base body and covers the accommodation slot 12. The base body is further defined with an opening communicated with the accommodation slot 12, and the driving member 4 is exposed from the opening. The sliding member 2 is of a strip-shaped plate structure, and a strip-shaped hole fitting the sliding member 2 is defined in the accommodation slot 12. The sliding member 2 is mounted in the strip-shaped hole and is slidable along the strip-shaped hole. The sliding member 2, the elastic member 5, and the main structure of the driving member 4 are accommodated in the accommodation slot 12. Only a part of the driving member 4 is exposed outside the mounting base 1 for a user to press. This allows the members to be hidden inside the base body, thereby making the structure more compact and improving the appearance.

Figure 16:
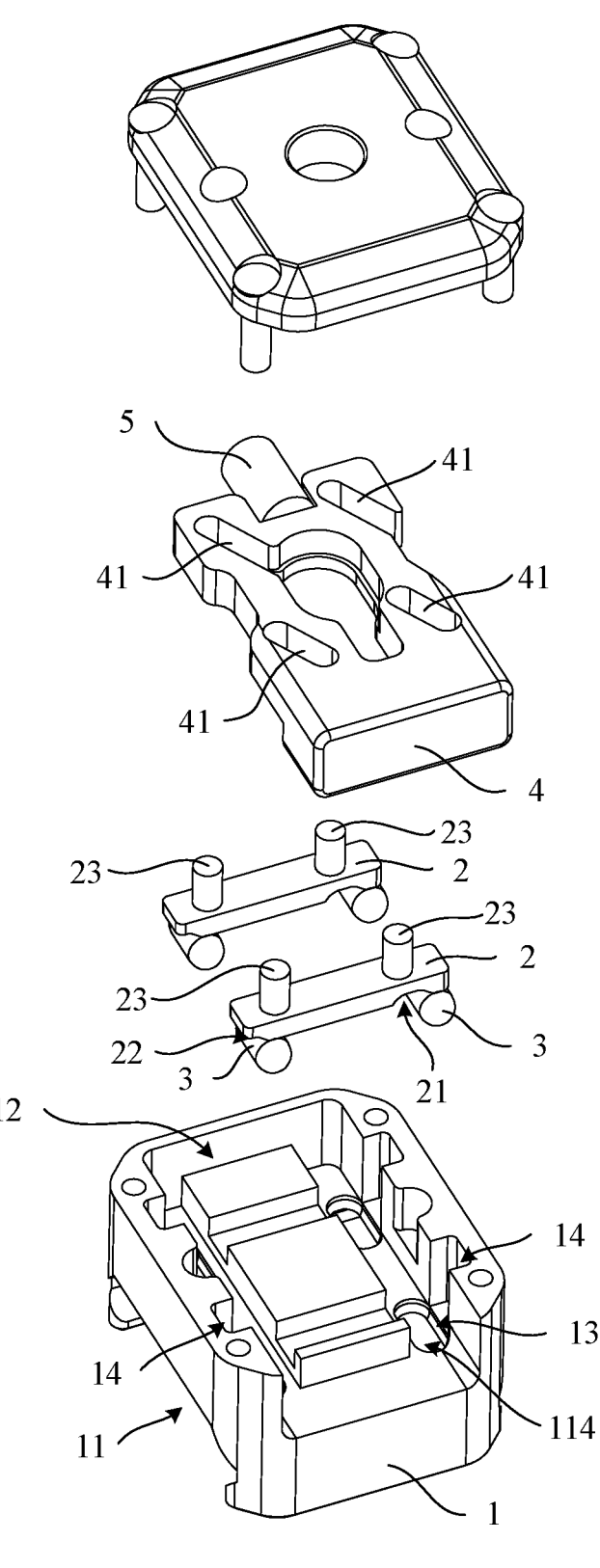
FIG. 16 is an exploded diagram of the quick-release assembly in FIG. 13.

In some embodiments, referring to FIG. 15 and FIG. 16, the driving member 4 and the sliding member 2 are stacked, and the sliding direction of the driving member 4 is different from the sliding direction of the sliding member 2.

The sliding member 2 is provided with a driving part 23, and the driving member 4 is defined with a slant groove 41. The driving part 23 is inserted in the slant groove 41 and is slidable along the slant groove 41. The sliding direction of the driving part 23 is at an included angle respective with the sliding direction of the driving member 4 and the sliding direction of the sliding member 2.

In the embodiments, the sliding direction of the driving member 4 is perpendicular to the sliding direction of the sliding member 2. The included angle between the sliding direction of the driving part 23 and the sliding direction of the driving member 4 and the included angle between the sliding direction of the driving part 23 and the sliding direction of the sliding member 2 may be set according to actual situations, such as 45°. It will be appreciated that, when the driving member 4 slides under the action of an external force or the elastic member 5, the position of the slant groove 41 of the driving member 4 changes, so that the side wall of the slant groove 41 pushes the driving part 23 inserted therein to slide along the slant groove 41, thereby driving the sliding member 2 to move. In some other embodiments, the sliding member 2 is defined with the slant groove 41, and the driving member 4 is provided with the driving part 23, which may be set according to actual situations. There may be one or more pairs of the driving parts 23 and the slant grooves 41, which may be set according to actual situations.

In some embodiments, referring to FIG. 15 and FIG. 16, the sliding member 2 is provided with two driving parts 23, and the two driving parts 23 are disposed adjacent to two ends of the sliding member 2.

Correspondingly, the driving member 4 is defined with two slant grooves 41. Each driving part 23 is inserted in one slant groove 41.

In the embodiments, the two driving parts 23 of the sliding member 2 are inserted in the two slant grooves 41 of the driving member 4, which improves the stability of the motion fit between the two. It will be appreciated that, a plurality of sliding members 2 may be provided. For example, two sliding members 2 are arranged in parallel, four slant grooves 41 are defined in the driving member 4, and four driving parts 23 of the two sliding members 2 are inserted in the four slant grooves 41 in a one-to-one correspondence. The number of the sliding members and the number of the slant grooves 41 may be set according to actual situations.

In some embodiments, referring to FIG. 16, the pressing surface of the sliding member 2 is defined with an avoidance groove 21, which is configured to avoid the resisting member 3 so as to release the resisting member 3 in the sliding process of the sliding member 2.

In case the avoidance groove 21 is located at the edge of one end of the sliding member 2, the avoidance groove 21 is formed at a corner position between the pressing surface and the side surface.

In the embodiments, the sliding member 2 is located above the resisting member 3 and is slidable relative to the resisting member 3. The sliding member 2 contacts the resisting member 3 with the pressing surface at the bottom thereof, so as to press the resisting member 3. In the process of pressing the driving member 4 to drive the sliding member 2, the avoidance groove 21 moves to the position of the resisting member 3 from an initial position so as to avoid the resisting member 3. The resisting member 3 enters the avoidance groove 21 from the pressing surface, such that the resisting member 3 is released to realize unlocking. After the driving member 4 is released, the driving member 4 drives the sliding member 2 to slide under the action of the elastic member 5, such that the avoidance groove 21 returns its initial position from the position of the resisting member 3. The resisting member 3 exits from the avoidance groove 21 and returns to the pressing surface, such that the resisting member 3 is pressed to realize locking. For each resisting member 3, one avoidance groove 21 is correspondingly provided in the pressing surface of the sliding member 2 to avoid the resisting member 3, and the position of the avoidance groove 21 in the pressing surface is set based on the position of the resisting member 3. In addition, according to an actual situation, in case the avoidance groove 21 is located at the edge of one end of the sliding member 2, the avoidance groove 21 is formed at a corner position between the pressing surface and the side surface. The avoidance groove 21 may be an arc-shaped avoidance groove, with one side of the groove wall extending to the pressing surface of the sliding member 2 and the other side of the groove wall extending to the side surface of the sliding member 2.

In some embodiments, referring to FIG. 16, at least one sliding member 2 is provided, and at least two resisting members 3 are provided. Each sliding member 2 correspondingly acts on at least two resisting members 3.

Correspondingly, at least two engaging grooves 201 are defined. Each resisting member 3 is engaged in one engaging groove 201.

In the embodiments, the quick-release assembly is in an engagement fit with the structural member 200 by the plurality of resisting members 3 and the plurality of engaging grooves 201. This increases the connection stability, thereby tightening the connection between the two devices. Further, a plurality of engaging grooves 201 are defined in the structural member 200, and the plurality of engaging grooves 201 are arranged along the sleeve direction of the quick-release assembly. Therefore, the position where the quick-release assembly is sleeved on the structural member 200 can be flexibly adjusted. In an actual application, the installation position of the device can be changed to avoid other structures.

In some embodiments, referring to FIG. 16, the resisting member 3 is a deformable structure. The bottom wall of the accommodation slot 12 is defined with a limiting groove 13 for receiving the resisting member 3. The mounting base 1 is defined with a through hole 114 communicating the fixing slot 11 and the limiting groove 13. The resisting member 3 is exposed from the through hole 114 to the side wall of the fixing slot 11.

In the embodiments, the limiting groove 13 fits the shape of the resisting member 3. The resisting member 3 is located in the limiting groove 13 and exposed from the through hole 114 to the side wall of the fixing slot 11. When the sliding member 2 presses the resisting member 3, the resisting member 3 is deformed into a tension state, thereby being in a stable engagement with the engaging groove 201. When the sliding member 2 does not press the resisting member 3, the resisting member 3 returns to its original shape and switches to a relaxation state, so as to be disengaged from the engaging groove 201. In some embodiments, the resisting member 3 is made of a silicone material or any other deformable material, which is not limited herein and may be set according to actual situations. In case a plurality of resisting members 3 are provided, a plurality of limiting grooves 13 are correspondingly defined in the accommodation slot 12, and one resisting member 3 is received in one limiting groove 13.

In some embodiments, referring to FIG. 15 and FIG. 16, each one of two opposite side walls of the accommodation slot 12 is defined with the recesses 14. The recess 14 is configured to avoid the side part of the sliding member 2, so as to allow the side part of the sliding member 2 to slide in. when performing an unlocking or locking operation, after the sliding member 2 slides into position, the side part of the sliding member 2 can correspondingly slide into the recess 14 defined in the side wall of the accommodation slot 12. By providing the recesses 14 in the side walls of the accommodation slot 12 to avoid the side parts of the sliding member 2, the side parts of the sliding member 2 can slide into the recesses 14, and there is no need to increase the space of the accommodation slot 12. Therefore, the structure is made more compact, and the size of the mounting base 1 is made as small as possible.

In some embodiments, referring to FIG. 13 to FIG. 16, the end surface of the mounting base 1 is provided with a first side plate 111 and a second side plate 112 facing each other. A free end of the first side plate 111 and a free end of the second side plate 112 bend and face each other. The fixing slot 11 is defined by the first side plate 111, the second side plate 112, and the mounting base 1. The first side plate 111 and the second side plate 112 are integrally formed with the mounting base 1. The first side plate 111 and the second side plate 112 extend from the end surface of the mounting base 1, and the fixing slot 11 is defined by the first side plate 111, the second side plate 112 and the mounting base 1. In case the mounting base 1 is sleeved on the structural member 200, the first side plate 111 and the second side plate 112 are correspondingly attached to two opposite sides of the structural member 200.

The driving member 4 is located on the side of the mounting base 1. The pressing direction of the driving member 4 is different from the extending direction of the fixing slot 11. In some embodiments, the pressing direction of the driving member 4 is perpendicular to the extending direction of the fixing slot 11. In case another component is mounted on the structural member 200, a user may press the driving member 4 from the side of the mounting base 1 that does not face the another component, which prevents interference on the pressing operation, thereby being convenient to operate.

In some embodiments, the first side plate 111 or the second side plate 112 is movable with respect to the mounting base 1 by a locking component 30. In the locked state, the first side plate 111 and the second side plate 112 press against the structural member 200. In the unlocked state, the first side plate 111 and the second side plate 112 release the structural member 200.

In some embodiments, the locking component 30 includes an adjustment screw rod 6, and one of the first side plate 111 and the second side plate 112 includes a L-shaped clamping block 1101A. The adjustment screw rod 6 passes through the L-shaped clamping block 1101A from the side surface of the clamping block 1101A and is threadedly connected with the mounting base 1. The adjustment screw rod 6 is screwed to make the L-shaped clamping block 1101A close to or away from the other one of the first side plate 111 and the second side plate 112, thereby pressing against or releasing the structural member 200. The adjustment screw rod 6 may further be provided with a spring, which is located between the L-shaped clamping block 1101A and the mounting base 1. The head portion of the adjustment screw rod 6 is entirely exposed on the outer surface of the mounting base 1 for a user to operate.

Figure 17:
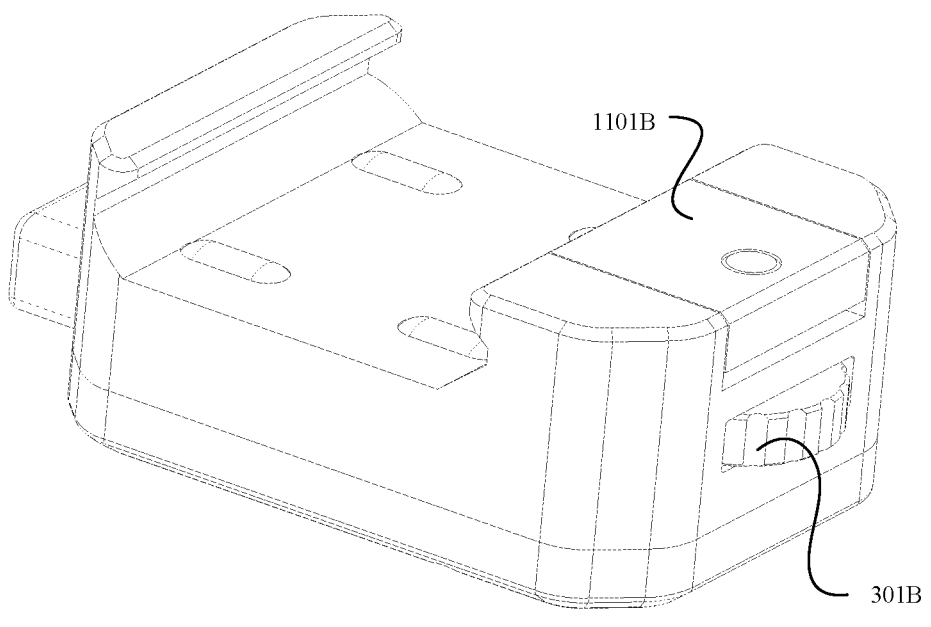
FIG. 17 is a structural schematic diagram of a quick-release assembly according to another embodiment of the present disclosure.
Figure 18:
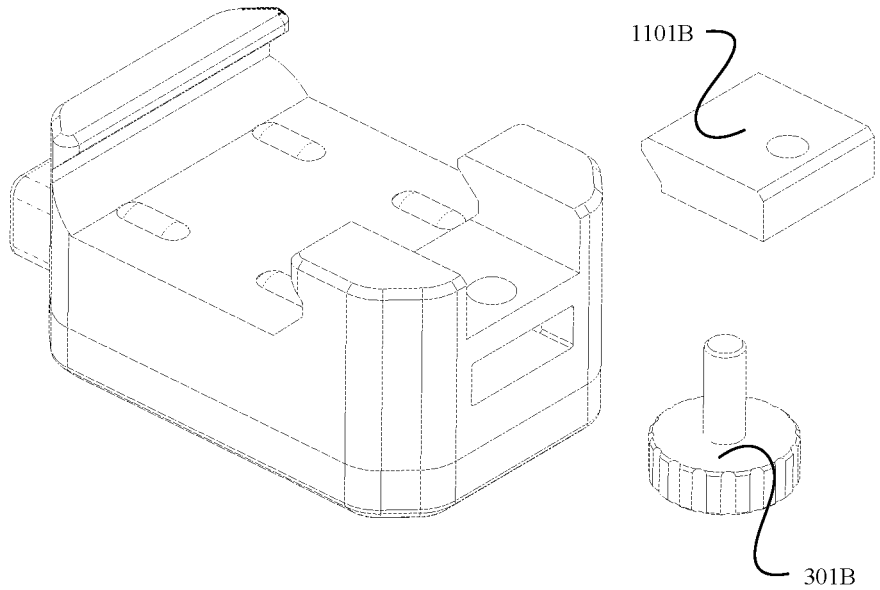
FIG. 18 is an exploded diagram of the quick-release assembly in FIG. 17.

In some other embodiments, referring to FIG. 17, the locking component 30 includes an adjustment screw rod 301B, and one of the first side plate 111 and the second side plate 112 includes a clamping block 1101B. The adjustment screw rod 301B passes through the mounting base 1 and is threadedly connected with the clamping block 1101B. The head portion of the adjustment screw rod 301B is exposed on the outer side surface of the mounting base 1, which makes the overall structure compact and beautiful. The adjustment screw rod 301B is screwed to make the clamping block 1101B close to or away from the bottom wall surface of the fixing slot 11, thereby pressing against or releasing the structural member 200.

In some embodiments, to allow the locking component 30 and the actuation structure to simultaneously unlock or lock the structural member, the locking component 30 is connected with the driving member. When pressing the driving member, the driving member drives the locking component to unlock the first side plate 111 or the second side plate 112; and when releasing the driving member, the driving member drives the locking component to lock the first side plate 111 or the second side plate 112. For example, the locking component includes a screw rod, one end of which passes through the mounting base 1 and is threadedly connected with the clamping block, and the other end of which is connected with the driving member. When pressing the driving member, the driving member drives the screw rod to rotate along a first direction so as to release the structural member; and when releasing the driving member, the driving member drives the screw rod to rotate along a second direction so as to tightly press the structural member. Specifically, the driving member is defined with an arc-shaped groove to drive the other end of the screw rod to rotate. In other embodiments, the screw rod may be driven to reset by a torsion spring.

According to some embodiments, the present disclosure further provides a connection structure. Referring to FIG. 19 and FIG. 20, the connection structure includes:

an upper connection base 10, the upper connection base 10 being configured to connect with a first device; and a lower connection base 20, the lower connection base 20 being configured to connect with a second device. The lower connection base 20 is defined with an engaging groove 201. The lower connection base 20 is detachably connected with the upper connection base 10 by a quick-release component 40. The quick-release component 40 includes an actuation structure 120, an elastic member 5, and a resisting member 3. The resisting member 3 is exposed on the outer surface of the upper connection base 10 and fits the engaging groove 201. The actuation structure 120 is movably disposed on the upper connection base 10. The elastic member 5 applies a force on the actuation structure 120 to reset the actuation structure 120.

The connection structure has an unlocked state and a locked state. In the unlocked state, the actuation structure 120 releases the resisting member 3 to allow the resisting member 3 to be disengaged from the engaging groove 201. In the locked state, the actuation structure 120 resets and presses the resisting member 3 to allow the resisting member 3 to be engaged in the engaging groove 201.

The connection structure in the embodiments is applied to photography equipment, so as to connect photography devices. In an actual application, two photography devices (hereinafter referred to as a first device and a second device) may be connected by the connection structure. The first device is connected to the upper connection base 10 by means of a cold shoe groove, a slider, a mounting hole, a screw connection, a snap-fit connection, or the like. For example, as shown in FIG. 19, the upper connection base 10 of the connection structure is defined with the mounting slot 101, and a sliding block is sleeved through the mounting slot 101 to connect the first device. The lower connection base 20 is connected with the second device by means of a cold shoe groove, a slider, a mounting hole, a screw connection, a snap-fit connection, or the like, so as to realize the connection between the two devices. For example, the lower connection base 20 is defined with a mounting hole, and a fastener passes through the mounting hole and is fixedly connected with the second device. There is at least one fastener. For example, there are two fasteners to prevent the lower connection base 20 from deflecting the second device during use. That is, the first device is connected to the upper connection base 10, and the second device is connected to the lower connection base 20, so as to realize the connection between the two devices. Especially in case that the second device is not provided with the engaging groove 201, the second device can be connected with the first device by way of the connecting of the lower connection base 20. The first device may be a microphone, a cold shoe holder, a fill light, and any other photography accessory body with a cold shoe slider. The second device may be a protective housing or frame of an electronic product, such as a camera, a mobile phone, and a monitor, and may also be any other photography accessory body, such as a top handle, a side handle, a sling handgrip, a stabilizer, or the like. In some embodiments, the elastic member 5 is a spring, and one or more springs may be provided according to actual situations.

The upper connection base 10 of the connection structure is detachably connected with the lower connection base 20 by the quick-release component 40. When the resisting member 3 is engaged in the engaging groove 201, the upper connection base 10 is fixed on the lower connection base 20. When the resisting member 3 is not engaged in the engaging groove 201, the upper connection base 10 is slidable on the lower connection base 20. Specifically, in the unlocked state, the actuation structure 120 on the upper connection base 10 releases the resisting member 3, so that the resisting member 3 is disengaged from the engaging groove 201 of the lower connection base 20, and as a result, the upper connection base 10 is separated from the lower connection base 20. In the locked state, the actuation structure 120 on the upper connection base 10 resets and presses the resisting member 3, so that the resisting member 3 is engaged in the engaging groove 201 of the lower connection base 20, and as a result, the upper connection base 10 is stably connected with the lower connection base 20. In this way, two devices can be tightly connected or quickly separated, thereby improving the user experience.

In some embodiments, referring to FIG. 21 and FIG. 22, the upper connection base 10 is defined with an accommodation slot 12. The actuation structure 120 slidably penetrates into the accommodation slot 12 and is at least partially exposed outside the upper connection base 10. The resisting member 3 is located on the sliding path of the actuation structure 120. The actuation structure 120 is configured to press or release the resisting member 3. One end of the elastic member 5 abuts against the actuation structure 120, and the other end of the elastic member 5 abuts against the side wall of the accommodation slot 12.

In the embodiments, the actuation structure 120 may be pressed to slide forward. The actuation structure 120 releases the resisting member 3 in the sliding process, so that the resisting member 3 is disengaged from the engaging groove 201 to realize unlocking, and as a result, the upper connection base 10 can be separated from the lower connection base 20. After the actuation structure 120 is released, the actuation structure 120 slides backward under the action of the elastic member 5. The actuation structure 120 presses the resisting member 3 in the sliding process, so that the resisting member 3 can be engaged in the engaging groove 201 to realize locking, and as a result, the upper connection base 10 is fixed to the lower connection base 20.

In some embodiments, the upper connection base 10 includes a base body 102 and a base cover 103. The accommodation slot 12 is formed in the base body 102. The base cover 103 is mounted on the base body 102 and covers the accommodation slot 12. The base body 102 is further defined with an opening communicated with the accommodation slot 12, and the actuation structure 120 is exposed from the opening. The actuation structure 120 is a strip-shaped plate structure. The accommodation slot 12 fits the actuation structure 120. The actuation structure 120 is mounted in the accommodation slot 12 and is slidable along the accommodation slot 12. The resisting member 3, the elastic member 5, and the main structure of the actuation structure 120 are accommodated in the accommodation slot 12. Only a part of the actuation structure 120 is exposed outside the mounting base 1 for a user to operate. This allows the members to be hidden inside the base body, thereby making the structure more compact and improving the appearance.

In some embodiments, referring to FIG. 22, the pressing surface of the actuation structure 120 is defined with an avoidance groove 21 configured to avoid the resisting member 3, so as to release the resisting member 3 in the sliding process of the actuation structure 120.

In the embodiments, the actuation structure 120 is located above the resisting member 3 and is slidable relative to the resisting member 3. The actuation structure 120 contacts the resisting member 3 with the pressing surface at the bottom thereof, so as to press the resisting member 3. In the process of pressing the actuation structure 120 to slide, the avoidance groove 21 moves to the position of the resisting member 3 from an initial position so as to avoid the resisting member 3. The resisting member 3 enters the avoidance groove 21 from the pressing surface, such that the resisting member 3 is released to realize unlocking. After the actuation structure 120 is released, the actuation structure 120 resets and slides under the action of the elastic member 5, and the avoidance groove 21 returns its initial position from the position of the resisting member 3. The resisting member 3 exits from the avoidance groove 21 and returns to the pressing surface, such that the resisting member 3 is pressed to realize locking. For each resisting member 3, one avoidance groove 21 is correspondingly defined in the pressing surface of the actuation structure 120 to avoid the resisting member 3, and the position of the avoidance groove 21 in the pressing surface is set based on the position of the resisting member 3. The avoidance groove 21 may be an arc-shaped avoidance groove 21, two sides of which extend to the pressing surface and the side surface of the actuation structure 120. The resisting member 3 may be waist-shaped.

In some embodiments, referring to FIG. 20, there are at least two resisting members 3, the number of the avoidance grooves 21 matches the number of the resisting members 3, and there are at least two engaging grooves 201. Each resisting members 3 is engaged in one engaging groove 201.

In the embodiments, the upper connection base 10 is in an engagement fit with the lower connection base 20 by the plurality of resisting members 3 and the plurality of engaging grooves 201. This increases the connection stability, thereby tightening the connection between the two photography devices.

Further, the upper connection base 10 is connected or disconnected with the lower connection base 20 by a connection slot 24 and a connection part in cooperation with the quick-release component 40. In some embodiments, the connection part is the base cover 103. The connection slot 24 is defined in the lower connection base 20, and the lower connection base 20 may be connected to the connection part of the upper connection base 10 through the connection slot 24. The resisting member 3 is exposed on the outer surface of the connection part. The engaging groove 201 is disposed in the bottom wall of the connection slot 24.

In some embodiments, referring to FIG. 19 to FIG. 22, one end surface of the lower connection base 20 is provided with two limiting parts 221 facing each other. Free ends of the two limiting parts 221 bend and face each other. The connection slot 24 is defined by the two limiting parts 221 and the lower connection base 20, to prevent the base cover 103 from be separated from the upper side of the connection slot 24. The resisting member 3 prevents the base cover 103 from sliding out from the opening on one side of the connection slot 24, also ensures the bearing force in the up-down direction, thereby preventing the upper connection base 10 from shaking during use.

The two limiting parts 221 are integrally formed with the lower connection base 20. The two limiting parts 221 extend from the end surface of the lower connection base 20. The connection slot 24 is defined by the two limiting parts 221 and the upper connection base 10. When the upper connection base 10 is sleeved on the lower connection base 20, the two limiting parts 221 are correspondingly attached to two opposite sides of the base cover 103. At least one of the two limiting parts 221 is rotatably connected with the lower connection base 20, to prevent interference between the base cover 103 and other photography accessory bodies in the connection slot 24.

In some embodiments, referring FIG. 21, the bottom wall of the accommodation slot 12 is defined with a limiting groove 13 for receiving the resisting member 3. The bottom wall of the limiting groove 13 is defined with a through hole communicating with the outside. The resisting member 3 is exposed from the through hole to the outer surface of the connection part (namely the base cover 103).

In the embodiments, the limiting groove 13 fits the shape of the resisting member 3. The resisting member 3 is located in the limiting groove 13 and exposed from the through hole to the outer surface of the connection part (namely the base cover 103). The actuation structure 120 presses the resisting member 3, such that the resisting member 3 forms a stable engagement with the engaging groove 201. When the actuation structure 120 does not press the resisting member 3, the resisting member 3 returns its relaxation state, so as to be disengaged from the engaging groove 201. In some embodiments, the resisting member 3 is a deformable structure. The resisting member 3 is made of a silicone material or any other deformable material, which is not limited herein and may be set according to an actual situation. The resisting member 3 may be made of a metal material, such as copper or aluminum alloy. In case a plurality of resisting members 3 are provided, a plurality of limiting grooves 13 are correspondingly defined in the accommodation slot 12. Each limiting groove 13 is configured to receive one resisting member 3. The actuation structure 120 is located on a side surface of the upper connection base 10. The pressing direction of the actuation structure 120 is the same as or different from the extending direction of the mounting slot 101. The pressing direction of the actuation structure 120 is the same as the extending direction of the connection slot 24. In some embodiments, referring to FIG. 21 and FIG. 22, a side wall of the accommodation slot 12 and the actuation structure 120 are provided with a stop groove 311 and a stop protrusion 19. The stop protrusion 19 is inserted into the stop groove 311 and is slidable along the stop groove 311. The sliding direction of the stop protrusion 19 is the same as the sliding direction of the actuation structure 1201.

In the embodiments, the stop groove 311 is disposed through the actuation structure 120, and the stop protrusion 19 is protruded on the side wall of the accommodation slot 12, which ensures the sliding direction of the actuation structure 120 and also controls the sliding range of the actuation structure 120.

To sum up, the mounting hole of the lower connection base 20 is provided with a fastener. One end of the fastener passes through the mounting hole and is screwed into the threaded hole of a mobile phone protective housing, such that the lower connection base 20 is fastened to the mobile phone protective housing. In the process of connecting the upper connection base 10 and the lower connection base 20, the actuation structure 120 is pressed, and the elastic member 5 is compressed. After the actuation structure 120 slides forward, the avoidance groove 21 reaches the position of the resisting member 3 from the initial position so as to avoid the resisting member 3. The resisting member 3 enters the avoidance groove 21 from the pressing surface, and as a result, the resisting member 3 is released. Then, the base cover 103 of the upper connection base 10 slides to the preset position from the opening on one side of the connection slot 24. After the actuation structure 120 is released, the elastic member 5 pushes the actuation structure 120 to reset and slide. Each avoidance groove 21 is reset from the position of one resisting member 3 to its initial position, and each resisting member 3 exits from the avoidance groove 21 and returns to the pressing surface. As a result, the resisting member 3 is pressed, thereby locking of the upper connection base 10 and the lower connection base 20. The upper end of the upper connection base 10 is defined with the mounting slot 101. A fill light with a sliding block may be mounted in the mounting slot 101. In such a way, the fill light is connected with a mobile phone mounted in a mobile phone protective housing, so as to carry out activities such as camera shooting.

The mounting slot 101 is allowed for the sliding block to slide in from one or either side. For example, the sliding block slides to the preset position from the opening on one side of the mounting slot 101 and slides out from the same opening. Alternatively, the sliding block slides to the preset position from the opening on one side of the mounting slot 101 and slides out from the opening on the other side of the mounting slot 101. The present disclosure is not limited thereto.

The present disclosure further provides a photography accessory, including an accessory body and the quick-disconnecting assembly as described in any of the foregoing embodiments. The mounting base 1 is fixedly, movably, or detachably connected with the accessory body. The specific structure of the quick-release assembly may refer to the foregoing embodiments. The photography accessory adopts all the technical solutions of the foregoing embodiments, so it at least has all the technical effects brought by the technical solutions of the foregoing embodiments, which is not detailed herein.

The present disclosure further provides a quick-release kit, including a structural member 200 and the photography accessory as described in any of the foregoing embodiments. The specific structure of the photography accessory may refer to the foregoing embodiments. The quick-release kit adopts all the technical solutions of the foregoing embodiments, so it at least has all the technical effects brought by the technical solutions of the foregoing embodiments, which is not detailed herein. The structural member 200 may be an intermediate member for connecting devices. For example, the structural member 200 is a connection plate to connect with a device. The connection plate is defined with a strip-shaped hole for a fastener to pass through, and the strip-shaped hole extends along the length direction of the connection plate. The device can be connected to the connection plate by a fastener or a locking member, and the connection position can be adjusted along the strip-shaped hole. The structural member 200 may also be a protective housing for an electronic device such as a camera, a mobile phone, and a monitor. The structural member 200 includes a first frame which is transversely defined with a plurality of engaging grooves 201 arranged in parallel and at intervals. After assembly, one end of each resisting member 3 abuts against the sliding member 2, and the other end of the resisting member 3 extends out of the bottom wall surface of the fixing slot 11 so as to abut against the inner surface of one engaging groove 201. The first frame is defined with a sliding slot 202 along its extending direction. The sliding slot 202 runs through the first frame in the up-down direction. The sliding slot 202 is configured to accommodate at least one locking member, which may be a screw. In some embodiments, two screws are mounted in the sliding slot 202. Preferably, the first frame is a slider to improve stability.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A quick-release assembly, comprising:
   a mounting base, a top end of the mounting base being defined with a fixing slot running left and right relative to the mounting base, a bottom end of the mounting base being defined with an accommodation slot, a limiting groove being defined in a bottom wall of the fixing slot, an opening at one end of the limiting groove being communicated with the accommodation slot, and an opening at the other end of the limiting groove being communicated with the fixing slot;
   a sliding member slidably accommodated in the accommodation slot; and
   a resisting member received in the limiting groove;
   wherein after assembly, one end of the resisting member abuts against the sliding member, and the other end of the resisting member extends out of a bottom wall surface of the fixing slot; and
   the sliding member is operated to slide to a first position to allow the sliding member to release the resisting member; and when the sliding member is unoperated, the sliding member drives the resisting member to reset.

2. The quick-release assembly according to claim 1, wherein a side surface of the sliding member facing the resisting member is recessed with an avoidance groove;
   wherein the resisting member slides into or out of the avoidance groove when the sliding member slides, and the sliding member slides to the first position to allow the avoidance groove to reach a position of the resisting member.

3. The quick-release assembly according to claim 1, wherein the resisting member is cylindrical, a shape of the limiting groove matches the resisting member, and the resisting member is transversely received in the limiting groove.

4. The quick-release assembly according to claim 2, further comprising:
   a driving member, slidably accommodated in the accommodation slot and located on a side of the sliding member away from the resisting member; and
   an elastic member, configured to apply a force on the driving member to push the sliding member against the resisting member;
   wherein an end of the driving member extends outside the accommodation slot, the driving member is connected with the sliding member by way of at least one slant groove and at least one driving part, and a free end of the at least one driving part is inserted in the at least one slant groove.

5. The quick-release assembly according to claim 4, wherein,
   the at least one slant groove is defined in the driving member; and
   the at least one driving part is provided on a side surface of the sliding member away from the avoidance groove;
   wherein when the driving member slides, the at least one driving part slides along an inner wall of the at least one slant groove to push the sliding member to slide.

6. The quick-release assembly according to claim 5, wherein the driving member extends along a front-rear direction of the mounting base, a sliding direction of the sliding member is substantially perpendicular to a sliding direction of the driving member, an extending direction of the at least one slant groove is at an included angle with the sliding direction of the sliding member, and the extending direction of the at least one slant groove is also at an included angle with the sliding direction of the driving member.

7. The quick-release assembly according to claim 5, wherein the sliding member is one of two sliding members, the two sliding members are arranged in parallel and spaced apart, each sliding member is elongated, and the driving member simultaneously drive the two sliding members to slide.

8. The quick-release assembly according to claim 7, wherein each sliding member is provided with two driving parts spaced apart, the driving member is defined with four slant grooves arranged at intervals, and the four slant grooves extend in a same direction.

9. The quick-release assembly according to claim 7, wherein,
   the avoidance groove is transversely formed in the sliding member, and two ends of the avoidance groove define openings; and
   the sliding member is provided with at least two avoidance grooves, one of the at least two avoidance grooves is formed at an end of the sliding member; the avoidance groove at the end of the sliding member is defined by an arc side wall and a bottom wall, and the bottom wall extends out of the end of the sliding member.

10. The quick-release assembly according to claim 1, wherein the fixing slot is defined by a first side plate and a second side plate facing each other;
    wherein one of the first side plate and the second side plate is movable, or both the first side plate and the second side plate are movable.

11. The quick-release assembly according to claim 10, wherein the first side plate is movable relative to the second side plate, a side wall of the first side plate is mounted with an adjustment screw rod, the adjustment screw rod passes through the first side plate and is threadedly connected with the mounting base, and a head portion of the adjustment screw rod is exposed on an outer surface of the first side plate.

12. A photography accessory, comprising:
    an accessory body; and
    the quick-release assembly of claim 1; wherein,
    the mounting base of the photography accessory is connected with the accessory body.

13. A quick-release kit, comprising:
    a structural member; and
    the photography accessory of claim 12, the quick-release assembly of the photography accessory being detachably connected with the structural member;
    wherein the structural member comprises a first frame, the first frame is defined with a plurality of engaging grooves arranged in parallel and at intervals; and
    after assembly, one end of the resisting member extends out of the bottom wall surface of the fixing slot, to abut against an inner surface of one of the plurality of engaging grooves.

\* \* \* \* \*